(12) United States Patent
Dekker

(10) Patent No.: US 10,387,628 B2
(45) Date of Patent: Aug. 20, 2019

(54) ACCESSING CONTENT AT A DEVICE

(71) Applicant: IRDETO B.V., Hoofddorp (NL)

(72) Inventor: Gerard Johan Dekker, Hoofddorp (NL)

(73) Assignee: IRDETO B.V., Hoofddorp (NL)

(*) Notice: Subject to any disclaimer, the term of this patent is extended or adjusted under 35 U.S.C. 154(b) by 12 days.

(21) Appl. No.: 15/562,427

(22) PCT Filed: Mar. 30, 2016

(86) PCT No.: PCT/EP2016/056897
§ 371 (c)(1),
(2) Date: Sep. 28, 2017

(87) PCT Pub. No.: WO2016/156380
PCT Pub. Date: Oct. 6, 2016

(65) Prior Publication Data
US 2018/0357391 A1      Dec. 13, 2018

(30) Foreign Application Priority Data

Mar. 30, 2015 (GB) .................................. 1505438.0

(51) Int. Cl.
*G06F 21/10* (2013.01)
*H04N 21/2347* (2011.01)
(Continued)

(52) U.S. Cl.
CPC ............ *G06F 21/10* (2013.01); *H04L 65/601* (2013.01); *H04N 21/23476* (2013.01);
(Continued)

(58) Field of Classification Search
CPC .................. G06F 21/00; H04L 2209/60; H04L 2209/603; H04L 2463/101
See application file for complete search history.

(56) References Cited

U.S. PATENT DOCUMENTS 7,568,111 B2 * 7/2009 Alve ...................... H04N 7/163
                                                       380/200
7,965,839 B2 * 6/2011 Candelore .......... H04N 21/2347
                                                       380/200
(Continued)

FOREIGN PATENT DOCUMENTS

EP      1 111 923 A1    6/2001
EP      1 564 622 A2    8/2005
(Continued)

OTHER PUBLICATIONS

International Search Report and Written Opinion Issued by WIPO dated Jul. 1, 2016 in connection with International Application No. PCT/EP2016/056897, 10 pages.
(Continued)

*Primary Examiner* — Izunna Okeke
(74) *Attorney, Agent, or Firm* — Rimon PC

(57) ABSTRACT

A method for accessing content at a device, wherein the device is arranged to execute a digital rights management (DRM) client of a DRM system and wherein the device is arranged to receive a broadcast signal comprising a plurality of encrypted portions of content for an item of content, each encrypted portion being packaged in a format of a conditional access system and being decryptable using a corresponding decryption key, wherein the method comprises an application executing on the device performing the steps of: for each of one or more of the encrypted portions: converting said encrypted portion from being packaged in the format of the conditional access system to being packaged in a format of the DRM system; providing said encrypted portion is packaged in the format of the DRM system to the DRM client; and either (a) providing a rights object according to the DRM system to the DRM client or (b) triggering the DRM client to obtain a rights object according to the DRM system; wherein the rights object corresponds to said
(Continued)

encrypted portion by comprising decryption key data for use by the DRM client to obtain the decryption key corresponding to said encrypted portion.

17 Claims, 12 Drawing Sheets

(51) Int. Cl.
*H04N 21/4385* (2011.01)
*H04N 21/4627* (2011.01)
*H04N 21/6334* (2011.01)
*H04N 21/8355* (2011.01)
*H04L 29/06* (2006.01)

(52) U.S. Cl.
CPC ... *H04N 21/43856* (2013.01); *H04N 21/4627* (2013.01); *H04N 21/63345* (2013.01); *H04N 21/8355* (2013.01); *G06F 2221/0728* (2013.01); *G06F 2221/0759* (2013.01); *H04L 2209/601* (2013.01); *H04L 2209/603* (2013.01)

(56) References Cited

U.S. PATENT DOCUMENTS

| | | | |
|---|---|---|---|
| 2006/0080259 A1* | 4/2006 | Wajs | G06F 21/10 705/51 |
| 2006/0136341 A1* | 6/2006 | Wajs | G06F 21/10 705/57 |
| 2007/0230700 A1 | 10/2007 | Dekker et al. | |
| 2009/0007240 A1 | 1/2009 | Vantalon et al. | |
| 2011/0010545 A1 | 1/2011 | Kill et al. | |
| 2011/0010562 A1 | 1/2011 | Kill et al. | |
| 2014/0281481 A1 | 9/2014 | Moroney | |

FOREIGN PATENT DOCUMENTS

| | | |
|---|---|---|
| EP | 2 079 033 A1 | 7/2009 |
| EP | 2 192 773 A1 | 6/2010 |
| EP | 2 227 014 A2 | 9/2010 |
| EP | 2 227 015 A2 | 9/2010 |
| EP | 2 230 845 A1 | 9/2010 |
| EP | 2 273 405 A1 | 1/2011 |
| EP | 2 334 069 A1 | 6/2011 |
| EP | 2 334 070 A1 | 6/2011 |
| EP | 2 341 708 A1 | 7/2011 |
| EP | 2 373 020 A1 | 10/2011 |
| EP | 2 506 174 A1 | 10/2012 |
| EP | 2 506 175 A1 | 10/2012 |
| WO | 01/067667 A1 | 9/2001 |
| WO | 2005/048603 A1 | 5/2005 |
| WO | 2009/002643 A1 | 12/2008 |
| WO | 2010/010099 A1 | 1/2010 |
| WO | 2012/016986 A1 | 2/2012 |
| WO | 2012/032122 A1 | 3/2012 |
| WO | 2012/049298 A1 | 4/2012 |
| WO | 2012/095181 A1 | 7/2012 |
| WO | 2012/122621 A1 | 9/2012 |
| WO | 2012/122674 A1 | 9/2012 |
| WO | 2012/130287 A1 | 10/2012 |
| WO | 2012/171712 A1 | 12/2012 |
| WO | 2013/107510 A1 | 7/2013 |
| WO | 2013/120525 A1 | 8/2013 |
| WO | 2014/079471 A1 | 5/2014 |
| WO | 2014/153728 A1 | 10/2014 |
| WO | 2014/154261 A1 | 10/2014 |
| WO | 2014/154535 A1 | 10/2014 |
| WO | 2016/045746 A1 | 3/2016 |
| WO | 2016/156380 A1 | 10/2016 |

OTHER PUBLICATIONS

"Digital Video Broadcasting", https://en.wikipedia.org/w/index.php?title=Digital_Video_Broadcasting&oldid=6478, retrieved on Apr. 14, 2018, 10 pages.

"Dynamic Adaptive Streaming over HTTP—Wikipedia", https://en.wikipedia.org/w/index.php?title=Dynamic_Adaptive_Streaming_over_HTT, retrieved on Apr. 14, 2018, 5 pages.

"Digital Video Broadcasting (DVB); DVB SimulCrypt; Head-end architecture and synchronization", ETSI TS 101 197 V1.2.1, Feb. 2002, retrieved on Apr. 14, 2018, 40 pages.

* cited by examiner

ACCESSING CONTENT AT A DEVICE

CROSS-REFERENCE TO RELATED APPLICATION

This application is a national stage entry of international application Ser. No. PCT/EP2016/056897 filed on Mar. 30, 2016, which claim the priority from GB application Ser. No. 1505438.0 filed on Mar. 30, 2015, the disclosure of which is incorporated herein by reference.

FIELD OF THE INVENTION

The present invention relates to methods for accessing content at a device, devices arranged to carry out such methods, and computer programs for such methods.

BACKGROUND OF THE INVENTION

It is well-known to protect, and control the use of, an item of content that is delivered (or communicated/transmitted) to an end user (or to a device used by an end user). However, as mobile data processing devices (such as smartphones, tablet computers, laptops, etc.) are becoming more and more prevalent and are more often than not the user's preferred device, it is important to be able to deliver items of content to such mobile data processing devices (thereby satisfying user demand) whilst at the same time ensuring a high level of security (thereby satisfying the requirements of content providers and content distributors). This is especially true given the very large number of such devices currently available and the rate at which new devices enter the market, coupled with the range of operating systems and software that such devices run, all of which make protection of content a difficult challenge.

SUMMARY OF THE INVENTION

According to a first aspect of the invention, there is provided a method for accessing content at a device, wherein the device is arranged to execute a digital rights management (DRM) client of a DRM system and wherein the device is arranged to receive a broadcast signal comprising a plurality of encrypted portions of content for an item of content, each encrypted portion being packaged in a format of a conditional access system and being decryptable using a corresponding decryption key, wherein the method comprises an application executing on the device performing the steps of:
  for each of one or more of the encrypted portions:
   converting said encrypted portion from being packaged in the format of the conditional access system to being packaged in a format of the DRM system;
   providing said encrypted portion packaged in the format of the DRM system to the DRM client; and
   either (a) providing a rights object according to the DRM system to the DRM client or (b) triggering the DRM client to obtain a rights object according to the DRM system;
  wherein the rights object corresponds to said encrypted portion by comprising decryption key data for use by the DRM client to obtain the decryption key corresponding to said encrypted portion.
In some embodiments, the method comprises the DRM client: obtaining the decryption key corresponding to said encrypted portion using the decryption key data; and decrypting some or all of said encrypted portion using the obtained decryption key.

In some embodiments, the application is separate from the DRM client. In some embodiments, the DRM client executes in a trusted execution environment of the device and the application does not execute in the trusted execution environment.

In some embodiments, the method comprises, for each of said one or more of the encrypted portions, the device receiving the rights object corresponding said encrypted portion over a data network. The method may then comprise identifying a next encrypted portion to be decrypted by the DRM client and issuing a request over the data network for a rights object corresponding to said next encrypted portion, wherein the rights object corresponding to said next encrypted portion is received in response to the request. The request may be issued by the application. In some embodiments, the method comprises the application: receiving the rights object in response to the request; and providing the received rights object to the DRM client. In some embodiments, said issuing comprises the application performing said triggering the DRM client and the DRM client, in response to said triggering, issuing the request.

In some embodiments, the method comprises: issuing a request over the data network, wherein, for each of said one or more of the encrypted portions, the corresponding rights object is received in response to the request; and storing, in a data store at the device, the received rights objects to enable the DRM client to subsequently obtain the stored rights objects.

In some embodiments, the method comprises: issuing a request over the data network, wherein, for each of said one or more of the encrypted portions, the corresponding rights object is received in response to the request; loading each received rights object into the DRM client; and storing, in a data store at the device, an identification of the each received rights object in association with an identification of the corresponding encrypted portion; wherein said triggering comprises either: (i) obtaining from the data store an identification of the rights object corresponding to an encrypted portion to be provided to the DRM client based on the identification of that encrypted portion and providing said obtained identification of the rights object to the DRM client or (ii) providing the identification of an encrypted portion to be provided to the DRM client to the DRM client to enable the DRM client to obtain from the data store an identification of the rights object corresponding to that encrypted portion. The identification of an encrypted portion may be based on an identification of a crypto-period corresponding to that encrypted portion. The identification of an encrypted portion may be received by the device within the broadcast signal.

In some embodiments, the device is one of: (a) a mobile communications device; (b) a mobile telephone; (c) a tablet computer; (d) a mobile data processing device.

In some embodiments, an encryption algorithm used by the conditional access system to generate the plurality of encrypted portions is the same as a content encryption algorithm used by the DRM system.

According to a second aspect of the invention, there is provided a device arranged to carry out a method according to the first aspect (or any embodiment thereof).

According to a third aspect of the invention, there is provided a method for enabling a device to access content, wherein the device is arranged to execute a digital rights management (DRM) client of a DRM system, the device being a device according to the second aspect, the method comprising: transmitting, via a broadcast network, a broadcast signal comprising a plurality of encrypted portions of content for an item of content, each encrypted portion being packaged in a format of a conditional access system and being decryptable using a corresponding decryption key; and providing, for each of one or more of the encrypted portions, a corresponding rights object, wherein said rights object corresponds to said encrypted portion by comprising decryption key data for use by the DRM client to obtain the decryption key corresponding to said encrypted portion.

According to a fourth aspect of the invention, there is provided a system arranged to carry out a method according to the third aspect.

According to a fifth aspect of the invention, there is provided a computer program which, when executed by one or more processors, causes the one or more processors to carry out a method according to the first aspect (or any embodiment thereof) or the third aspect. The computer program may be stored on a computer-readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Embodiments of the invention relate to items of content and methods and systems for controlling access to (or controlling use of, or helping to secure or protect) such items of content. Herein, the term "content" relates to any type of media (such as audio data, video data, image data, multimedia data, etc.), and an item of content may comprise (or represent or encode) one or more different types of such media. Two known ways of protecting an item of content and controlling its use are (a) the use of a so-called "conditional access" (or CA) system or (b) the use of a so-called "digital rights management" (or DRM) system.

1—CA Systems

Figure 1:
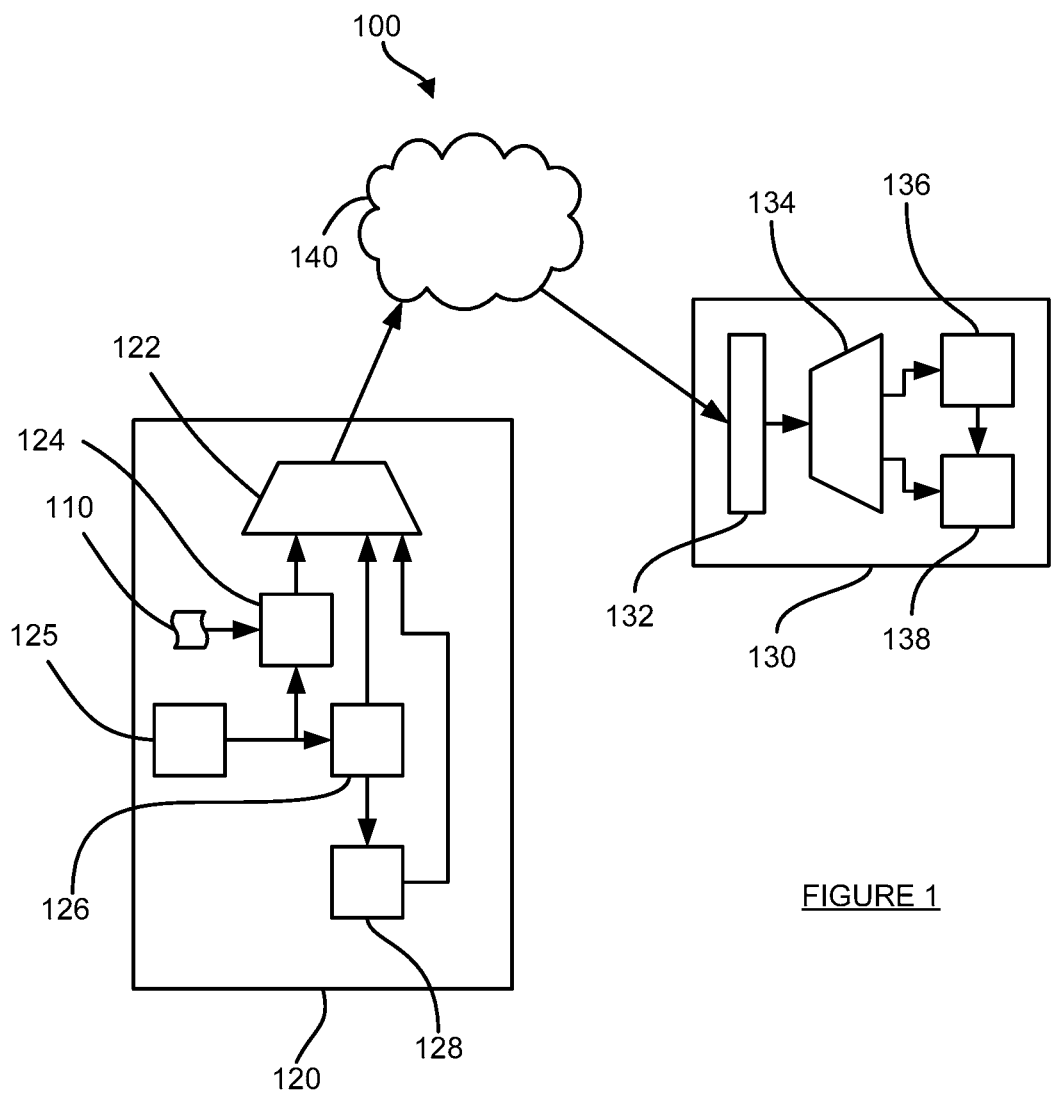
FIG. 1 schematically illustrates an example conditional access system.

An example CA system 100 is illustrated schematically in FIG. 1. The CA system 100 comprises a head-end system 120 communicably coupled to a user's device (or receiver) 130 via a network 140. The head-end system 120 provides an item of content 110 to the device 130 via the network 140.

The provision of the item of content 110 to the device 130 may be performed as a broadcast, so that the item of content 110 is transmitted as part of a broadcast signal, in which case the network 140 may comprise a satellite communications network or a terrestrial broadcast network—in this case, the communication may be uni-directional, i.e. from the head-end system 120 to the device 130 without a return channel. The provision of the item of content 110 to the device 130 may be performed as a unicast or multicast transmission, in which case the network 140 may comprise a cable distribution network or a data communication network such as the internet.

The device 130 could be any device suitable for receiving the item of content 110 from the head-end system 120. The device 130 may also be arranged to render (e.g. output via a display or one or more speakers) a received item of content 110. For example, the device 130 could be a television, a set-top-box, a personal computer, etc. The device 130 comprises, or uses or executes, a network interface 132, a demultiplexor 134, a CA module 136 and a decryption module 138. These may each be, or may implemented by, a hardware component, a software component executed by a processor of the device 130, or a combination of hardware and software components. They shall be described in more detail below.

The head-end system 120 comprises a multiplexor 122, a content encryption module 124, a CW generator 125, an ECM generator 126 and an EMM generator 128. These may each be, or may implemented by, a hardware component, a software component executed by a processor of the head-end system 120, or a combination of hardware and software components. They shall be described in more detail below.

The head-end system 120 encrypts the item of content 110 using one or more encryption keys referred to as control words (CWs). To increase security, the CWs are changed periodically, so that a single CW is only used for encrypting a corresponding portion P of the item of content 110. The portion P may be a single contiguous section (or chunk or part) of the item of content 110, but this need not necessarily be the case. The period/interval during which a CW is used for the encryption is called a corresponding crypto-period (CP). Each CP is, typically, about 2-10 seconds long. Thus, the head-end system identifies (or specifies) a plurality (or sequence) of CPs ($CP_i$ for i=1, 2, . . . ) for, or in relation to, an item of content 110, generates (using the CW generator 125) corresponding CWs ($CW_i$ for i=1, 2, . . . ) and encrypts (using the content encryption module 124) a corresponding portion ($P_i$ for i=1, 2, . . . ) of the item of content 110 with the corresponding CW ($CW_i$ for i=1, 2, . . . ) to generate an encrypted item of content comprising encrypted portions $\{P_i\}_{CW_i}$. This is illustrated schematically in FIG. 2. In FIG.

2, the circles with crosses represent encryption operations. Herein, an amount of data D that has been encrypted is shown in braces, i.e. as $\{D\}$. If that amount of data is decryptable using a key k, then the encrypted amount of data is shown as $\{D\}_k$. Thus, "$\{P_i\}_{CW_i}$" represents the encrypted version of the portion $P_i$ that is decryptable using $CW_i$.

The device 130 will need $CW_i$ in order to be able to decrypt the corresponding encrypted portion $\{P_i\}_{CW_i}$. Therefore, the head-end system 120 generates (using the ECM generator 126) so-called entitlement control messages (ECMs). Each ECM comprises an encrypted version of a CW, or at least data from which the CA module 136 can derive a CW. For example, the ECM generator 126 may receive the CWs generated by the CW generator 125 and encrypt the received CWs using a particular encryption key K, so that each ECM may then comprises a corresponding encrypted CW, i.e. $\{CW\}_K$. The head-end system 120 provides the ECMs to the device 130 via the network 140. For any given $CW_i$ (i=1, 2, ...), the head-end system 120 may provide the device 130 with one or more ECMs each comprising the encrypted version of that CW, i.e. comprising $\{CW_i\}_K$. It is possible that the head-end system 120 may change the key K during the provision of the item of content 110 to the device 130 (so that some ECMs use a first value for the key K and subsequent ECMs use a different value for the key K).

The device 130 will need K in order to be able to decrypt an encrypted CW (i.e. $\{CW_i\}_K$) contained in a received ECM. Therefore, the head-end system 120 generates (using the EMM generator 128) a so-called entitlement management message (EMM) for, or targeted at or addressed to, the device 130 (or for, or targeted at or addressed to, a group of devices to which the device 130 belongs). The EMM generator 128 receives the key K from the ECM generator 126. The EMM generator 128 encrypts the key K to generate an encrypted key $\{K\}_W$. For this, the EMM generator 128 may use a public key that corresponds to a private key W stored by the CA module 136 to encrypt the key K, or may use a secret symmetric key W shared between the head-end system 120 and the CA module 136 to encrypt the key K. The public key or the secret key may have been established, and provided to the head-end system 120, when the CA module 136 was initially created, so that the head-end system 120 may store the public key or the secret key in association with an identification of the corresponding CA module 136 for later use. The EMM comprises the encrypted version of the key K, i.e. $\{K\}_W$. The head-end system 120 provides the EMM to the device 130 via the network 140.

The head-end system 120 therefore communicates over the network the EMMs, ECMs and the encrypted portions (i.e. $\{P_i\}_{CW_i}$ for i=1, 2, ...). For example, the head-end system 120 may create a transport stream comprising, in multiplexed form, a stream of one or more EMMs, a stream of ECMs and a stream of encrypted portions. Thus, for example, the multiplexor 122 may receive the encrypted content portions $\{P_i\}_{CW_i}$ output from the content encryption module 124, the ECMs output from the ECM generator 126 and the EMMs output from the EMM generator 128, and multiplex them together to form a transport stream. The multiplexor 122 may also include, in the transport stream, similar streams with EMMs, ECMs and encrypted portions for other items of content—for example, the transport stream may comprise data for one or more different encrypted programs/services. The multiplexor 122 may also include, in the transport stream, other data, such as electronic program guide data or content streams for non-protected content.

Figure 2:
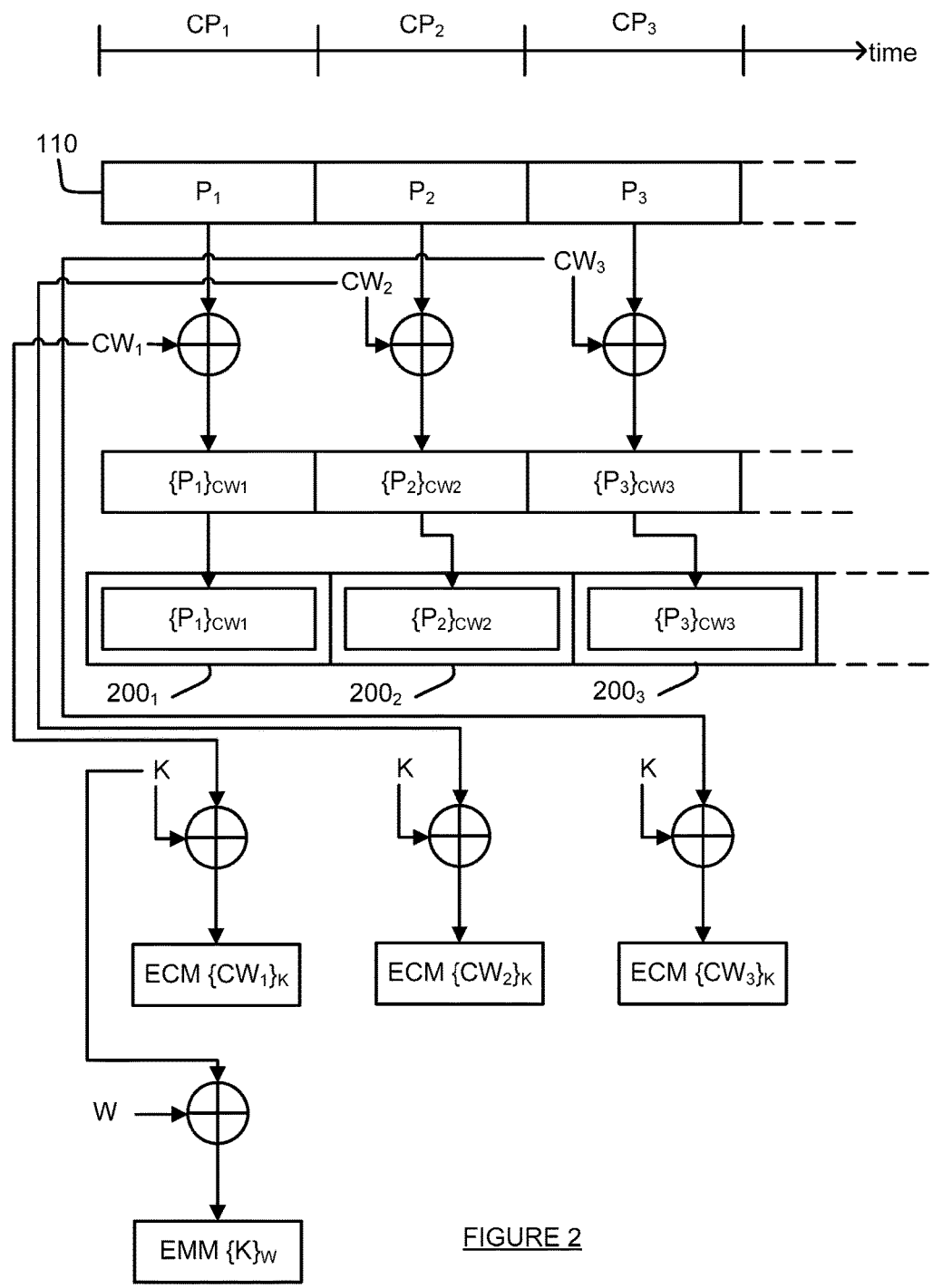
FIG. 2 schematically illustrates the operation of a head-end system of the conditional access system of FIG. 1.

The encrypted portions (i.e. $\{P_i\}_{CW_i}$ for i=1, 2, ...) may be packaged (or formatted) according to a format of the CA system 100 before being communicated to the device 130. Such packaging may be performed, for example, by the content encryption module 124. The packaging may comprise, for example, splitting or encoding an encrypted portion $\{P_i\}_{CW_i}$ (for i=1, 2, ...) into one or more data packets (where each data packet may have an associated packet header and/or error correction data and/or other data etc. in addition to some or all of the data for one or more encrypted portions $\{P_i\}_{CW_i}$), with the packets then being communicated over the network 140. The nature of the packets and the resultant packaging depends on the communication standard/protocol being adopted. Such packaging may comprise adding or sending additional data along with each encrypted portion $\{P_i\}_{CW_i}$ (for i=1, 2, ...) (or along with each part of an encrypted portion $\{P_i\}_{CW_i}$ if the encrypted portion $\{P_i\}CW_i$ is divided across multiple packets)—this additional data could comprise, for example: an identification of the crypto-period (namely $CP_i$) to which that encrypted portion $\{P_i\}_{CW_i}$ corresponds (so that the device 130 can identify the correct ECM and $CW_i$ namely $CW_i$) to use to decrypt that encrypted portion $\{P_i\}_{CW_i}$; an identification of the item of content 110 to which this encrypted portion $\{P_i\}_{CW_i}$ relates; a packet sequence number; error correction/detection information to help the device 130 correct/detect errors in a received encrypted portion $\{P_i\}_{CW_i}$ etc. Thus, as shown in FIG. 2, each encrypted portion $\{P_i\}_{CW_i}$ is packaged 200$_i$ in a format of the CA system 100 and is decryptable using a corresponding decryption key $CW_i$.

At the device 130, the network interface 132 receives the communications/transmissions from the head-end system 120. The network interface 132 may, for example, comprise an antenna for receiving a signal broadcast via a satellite network 140 or via a terrestrial broadcast network 140, a demodulator/tuner and an analog-to-digital converter for obtaining and generating a digital signal from the received broadcast signal. The network interface 132 may comprise an interface for receiving communications/signals sent over a cable network 140 or over a data network 140.

The demultiplexor 134 is arranged to identify the different components in the received signal and to select those components relating to a desired/selected service/program. For example, if the user of the device 130 wishes to watch/listen/record this specific item of content 110, then the demultiplexer 134 may identify, in the received signal, EMMs and ECMs relating to this item of content 110 and pass them to the CA module 136 and, similarly, may identify encrypted portions $\{P_i\}_{CW_i}$ relating to this item of content 110 and pass them to the decryption module 138. The CA module 136 processes an EMM to obtain the key K—in particular the CA module 136 may use the private key W corresponding to the public key that the head-end system 120 used or may use the secret key W shared between the head-end system 120 and the CA module 136 as appropriate to decrypt the data $\{K\}_W$ in a received EMM directed at this CA module 136 to obtain the key K. The CA module 136 may then use the key K to decrypt the encrypted CWs contained in the received ECMs in order to obtain those CWs. The CA module 136 may then pass the received CWs to the decryption module 138—the decryption module 138 may then use the received CWs to decrypt the corresponding encrypted portions $\{P_i\}_{CW_i}$.

The CA module 136 may be a hardware smartcard, or may be implemented as a software module using one or more software protection techniques (such as software obfuscation).

Whilst the above CA system 100 has been described with each content portion $P_i$ being encrypted using its own corresponding CW (namely $CW_i$), in some CA systems 100, that portion $P_i$ may be viewed as multiple separate (sub) portions $P_{i,1}$, $P_{i,2}$, ..., each of which is encrypted using the same CW (namely $CW_i$), so that each corresponds to a part of the CP (namely $CP_i$) for that CW. Thus, the head-end system 120 may communicate encrypted (sub)portions (i.e. $\{P_{i,j}\}_{CW_i}$ for i=1, 2, ... and j=1, 2, ... ) to the device 130, where each encrypted (sub)portion is packaged (or formatted) according to a format of the CA system 100 before being communicated to the device 130. It will be appreciated that, where reference is made herein to an encrypted portion $\{P_i\}_{CW_i}$, this applies equally to an encrypted (sub)portion $\{P_{i,j}\}_{CW_i}$.

Various modifications of the CA system 100 set out above are known, For example, whilst the CA system 100 discussed above uses a so-called "key-ladder" involving the keys W and K, other key ladders could be used with different numbers, or arrangements, of keys and corresponding encrypted data in order to ultimately provide CWs to the device 130. In general, however, all CA systems involve generating and transmitting EMMs (for controlling access to the content to one or more specific devices), ECMs (for providing CWs to devices, provided they have been granted access via an EMM) and corresponding encrypted portions of content $\{P_i\}_{CW_i}$.

2—DRM Systems

Figure 3:
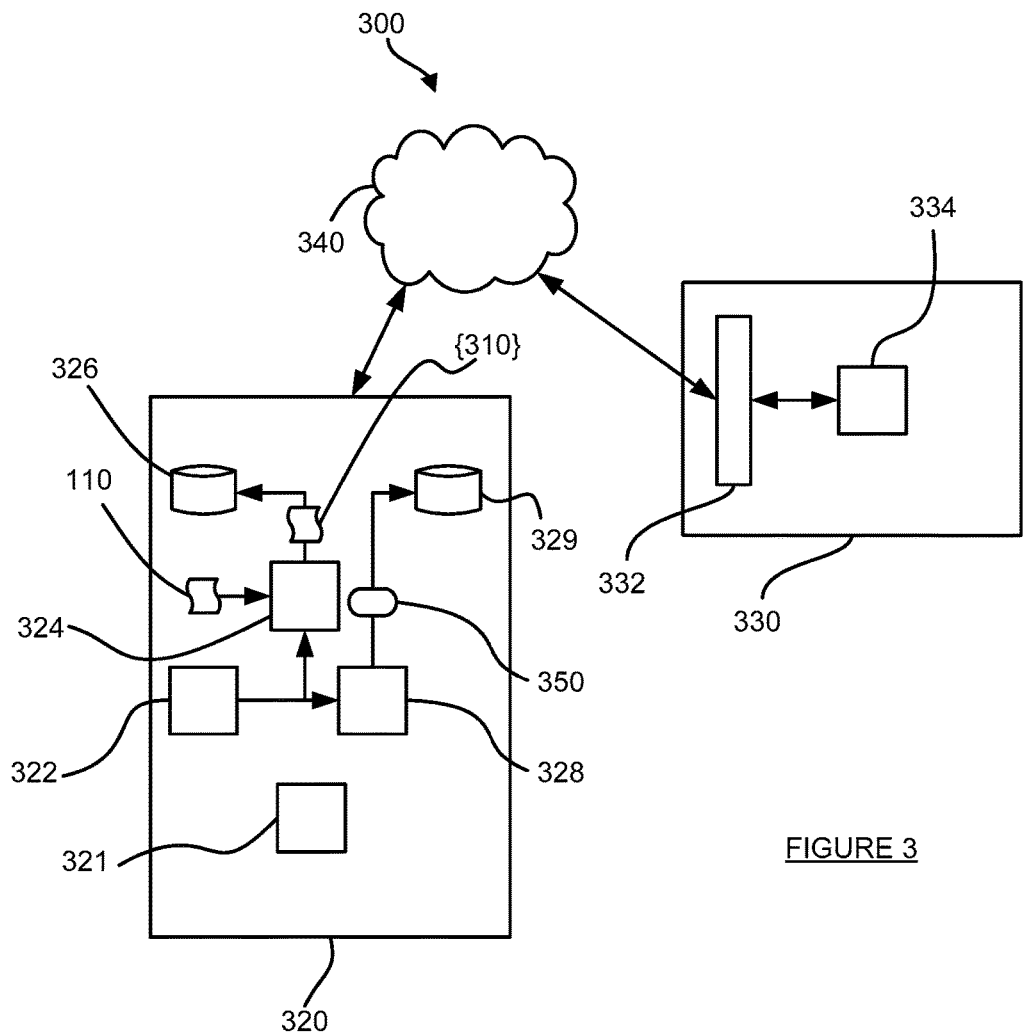
FIG. 3 schematically illustrates an example digital rights management system.

An example DRM system 300 is illustrated schematically in FIG. 3. The DRM system 300 comprises a DRM provider 320 communicably coupled to a user's device (or receiver) 330 via a network 340. The DRM provider 320 provides an item of content 110 to the device 330 via the network 340.

The network 340 may be any data communication network via which the DRM provider 320 may communicate data to the device 330 and via which the device 330 may communicate data to the DRM provider 320. For example, the network 340 may comprise one or more of: a local area network, a wide area network, a metropolitan area network, the Internet, a wireless communication network, a wired or cable communication network, etc.

The device 330 could be any device suitable for receiving the item of content 110 from the DRM provider 320. The device 330 may also be arranged to render (e.g. output via a display or one or more speakers) a received item of content 110. For example, the device 330 could be a television, a set-top-box, a personal computer, etc. The device 330 comprises, or uses or executes, a network interface 332 and a DRM client 334. These may each be, or may be implemented by, a hardware component, a software component executed by a processor of the device 330, or a combination of hardware and software components. They shall be described in more detail below.

The DRM provider 320 comprises an encryption key generator 322, a content encryption module 324, a content database or store 326, a rights object (RO) generator 328, an RO database or store 329, and a control module 321. These may each be, or may be implemented by, a hardware component, a software component executed by a processor of the DRM provider 320, or a combination of hardware and software components. They shall be described in more detail below.

The control module 321 is responsible for the overall control/operation of the DRM provider 320—for example, the control module 321 may control the encryption of an item of content 110, the provision of the encrypted item of content {110} to the device 330, the generation of ROs and the provision of an RO to a device 330 if that device 330 (or the user of that device 330) is authorised to access or use the item of content 110. To this end, the control module 321 may process requests received from the device 330 for access to content, handle the processing of payment/subscription details, etc. as is known in this field of technology. As such details are not important to understanding the present invention, such functionality of the DRM provider 320 shall not be described in more detail herein.

The encryption key generator 322 generates one or more keys $K_i$ (for i=1, 2, ... ) for encrypting the item of content 110. The content encryption module 324 uses the one or more keys $K_i$ to encrypt the item of content 110 to form an encrypted item of content {110}. The encrypted item of content {110} may be stored in the content database 326. The encrypted item of content {110} may subsequently be accessed from the content database 326 and communicated, via the network 340, to the device 330 (e.g. in response to the DRM provider 320 receiving a request for the item of content 110 from the device 330 or from a user of the device 330). Additionally or alternatively, the output of the content encryption module 324 may be provided to the device 330 without necessarily having to be stored first in the content database 326.

Figure 5:
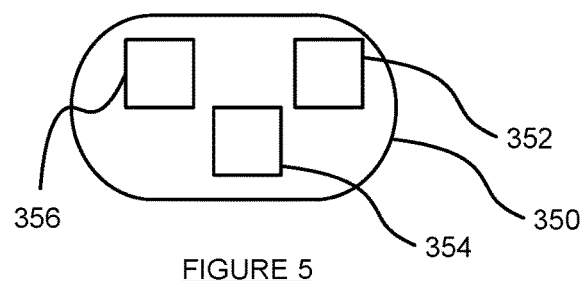
FIG. 5 schematically illustrates an example rights object.

The device 330 will need the one or more keys $K_i$ in order to be able to decrypt the corresponding encrypted item of content {110} to thereby access the original item of content 110. Therefore, the DRM provider 320 generates (using the RO generator 328) a rights object (RO) 350. The nature of the RO 350 is illustrated schematically in FIG. 5. The RO 350 is a data object comprising decryption key data 352, which is data from which the one or more keys $K_i$ can be obtained by the DRM client 334. For example, the decryption key data 352 may comprise the one or more keys $K_i$ in an encrypted form, where the DRM client 334 has access to a corresponding decryption key for decrypting these encrypted one or more keys $K_i$ to thereby obtain the one or more keys $K_i$. The RO 350 may also contain content metadata 354, which may comprise any metadata such as data identifying the item of content 110, data specifying properties (e.g. data format, bit rate, etc.) of the item of content 110, data specifying other data (e.g. title, actors, creation/release date(s), etc.) relating to the item of content 110, etc. The RO 350 may also contain usage data 356 specifying one or more usage rights or conditions or privileges or entitlements associated with the item of content 110 (such as a number of times that the item of content 110 may be used at the device 330 and/or a time of day during which the item of content 110 may be used at the device 330 and/or whether or not the item of content 110 may be recorded and/or copied and/or redistributed by the device 330; etc.). Some or all of the data of the RO 350 may be stored in the RO 350 in a protected form (e.g. encrypted and/or digitally signed) to prevent unauthorised access and/or modification of that data. The DRM client 334 may, therefore, be arranged to decrypt, and/or validate the authenticity of, some/all of the data of the RO 350 and/or validate the authenticity of the origin of the RO 350, where such decryption and/or validation uses one or more cryptographic keys known to, or accessible by, the DRM client 334. Such cryptographic techniques, and ROs in general, are well-known and shall not be described more in detail herein. It will be appreciated that ROs may take other forms too.

The RO 350 may be stored in the RO database 329. The RO 350 may subsequently be accessed from the RO database 329 and communicated, via the network 340, to the device 330 (e.g. in response to the DRM provider 320 receiving a request for the item of content 110 from the device 330 or from a user of the device 330). Additionally or alternatively, the RO 350 output from the RO generator 328 may be provided to the device 330 (without necessarily having to be stored first in the RO database 329).

At the device 330, the network interface 332 receives the encrypted item of content {110} and the RO 350 from the DRM provider 320 via the network 340. In particular, the device 330 (or the user of the device 330) may have issued a request to the DRM provider 320 (which may have involved using the DRM client 334), to request the item of content 110 from the DRM provider 320. In response to this request, the DRM provider 320 may communicate the encrypted item of content {110} and the RO 350 to the device 330 via the network 340 as discussed above. This could involve, for example, the control module 321 verifying the identity of the user of the device 330 (or of the device 330 or of the DRM module 334) and verifying whether or not the user of the device 330 (or the device 330 or the DRM module 334) is authorised to receive the item of content 110 (e.g. by virtue of a payment having been made or a valid subscription being in place), and only providing the encrypted item of content {110} and the RO 350 to the device 330 if the identity and authorisation are successfully verified. The encrypted item of content {110} and the RO 350 may be received together. Alternatively, it is possible that the device 330 may have already (or previously) obtained or downloaded the encrypted item of content {110} from the DRM provider 320 (e.g. in response to the DRM provider 320 receiving a first request from the device 330), in which case the device 330 (or the user of the device 330) may issue a second request to the DRM provider 320 (which may involve using the DRM client 334), to request (and receive in response to the request) the RO 350 that corresponds to the already-obtained encrypted item of content {110}. Conversely, it is possible that the device 330 may have already (or previously) obtained or downloaded an RO 350 corresponding to an encrypted item of content {110} from the DRM provider 320 (e.g. in response to the DRM provider 320 receiving a first request from the device 330), in which case the device 330 (or the user of the device 330) may issue a second request to the DRM provider 320 (which may involve using the DRM client 334), to request (and receive in response to the request) the encrypted item of content {110} that corresponds to the already-obtained RO 350.

The DRM client 334 may access or obtain the one or more keys $K_i$ using the received RO 350 and perform a decryption operation on the received encrypted item of content {110} in order to obtain the cleartext item of content 110. The DRM client 334 may control subsequent output or rendering or usage of the item of content 110 in accordance with any usage data 356 contained within the RO 350.

The encrypted item of content {110} generated by the DRM provider 320 will be in a format of the DRM system 300. For example, the DRM client 334 may need to be able to parse the encrypted item of content {110} to identify where the encrypted data resides within the actual data object making up the encrypted item of content {110}, in which case encrypted content data within the encrypted item of content {110} may be located at certain predefined locations within the encrypted item of content {110}. The encrypted item of content {110} may comprise data in addition to the actual encrypted content data, such as one or more headers that contain data to assist the DRM client 334 in its processing of the encrypted item of content {110}—such data could include, for example: data identifying the encrypted item of content {110}, a link to, or an address of, the DRM provider 320 so that the DRM client 334 knows a location from which to request and obtain the RO 350; an identification of the corresponding RO 350; metadata describing the item of content 110 (e.g. title, data format, creation/release date(s), etc.). The particular format for the encrypted item of content {110} will depend on the particular DRM system 300 being used, which could, for example, be a proprietary format or a standardised format.

It will be appreciated that whilst the DRM provider 320 has been shown as a single system in FIG. 3, the DRM provider 320 may be made up of two or more different (sub)systems which may be co-located or which may be separated. For example, a first (sub)system may comprise the encryption key generator 322, the content encryption module 324 and the content database 326; a second (sub)system may comprise the rights object (RO) generator 328 and the RO database or store 329; whilst a third (sub)system may comprise the control module 321. In this way, the entity responsible for generating the encrypted item of content {110} may be separate from the entity responsible for generating, managing and providing ROs.

3—Example Computer System or Data Processing System

Figure 4:
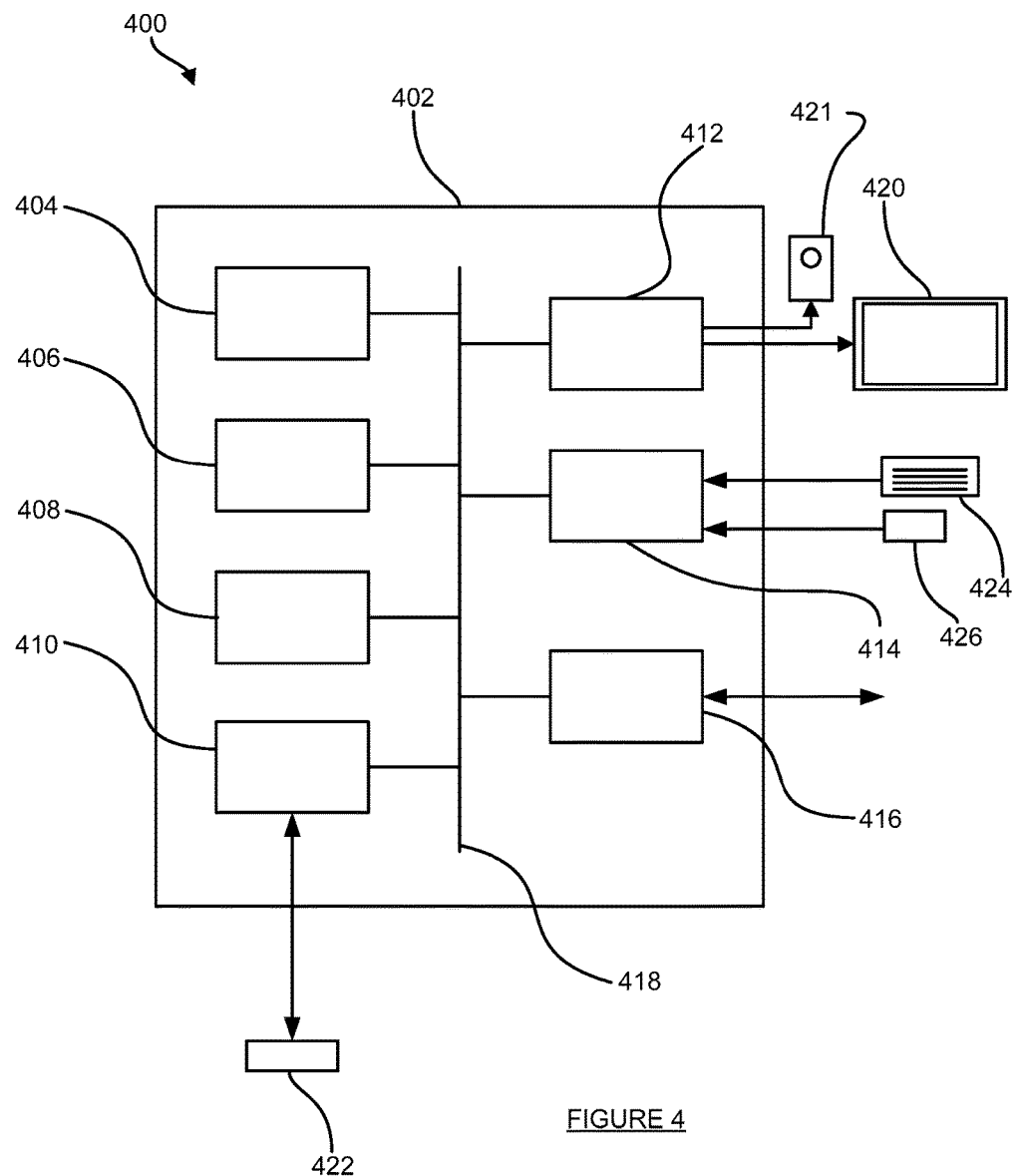
FIG. 4 schematically illustrates an example of a computer system.

FIG. 4 schematically illustrates an example of a computer system 400. The system 400 comprises a computer 402. The computer 402 comprises: a storage medium 404, a memory 406, a processor 408, an interface 410, a user output interface 412, a user input interface 414 and a network interface 416, which are all linked together over one or more communication buses 418.

The storage medium 404 may be any form of non-volatile data storage device such as one or more of a hard disk drive, a magnetic disc, an optical disc, a ROM, etc. The storage medium 404 may store an operating system for the processor 408 to execute in order for the computer 402 to function. The storage medium 404 may also store one or more computer programs (or software or instructions or code).

The memory 406 may be any random access memory (storage unit or volatile storage medium) suitable for storing data and/or computer programs (or software or instructions or code).

The processor 408 may be any data processing unit suitable for executing one or more computer programs (such as those stored on the storage medium 404 and/or in the memory 406), some of which may be computer programs according to embodiments of the invention or computer programs that, when executed by the processor 408, cause the processor 408 to carry out a method according to an embodiment of the invention and configure the system 400 to be a system according to an embodiment of the invention. The processor 408 may comprise a single data processing unit or multiple data processing units operating in parallel, separately or in cooperation with each other. The processor 408, in carrying out data processing operations for embodiments of the invention, may store data to and/or read data from the storage medium 404 and/or the memory 406.

The interface 410 may be any unit for providing an interface to a device 422 external to, or removable from, the computer 402. The device 422 may be a data storage device, for example, one or more of an optical disc, a magnetic disc, a solid-state-storage device, etc. The device 422 may have processing capabilities—for example, the device may be a smart card. The interface 410 may therefore access data from, or provide data to, or interface with, the device 422 in accordance with one or more commands that it receives from the processor 408.

The user input interface 414 is arranged to receive input from a user, or operator, of the system 400. The user may provide this input via one or more input devices of the system 400, such as a mouse (or other pointing device) 426 and/or a keyboard 424, that are connected to, or in communication with, the user input interface 414. However, it will be appreciated that the user may provide input to the computer 402 via one or more additional or alternative input devices (such as a touch screen). The computer 402 may store the input received from the input devices via the user input interface 414 in the memory 406 for the processor 408 to subsequently access and process, or may pass it straight to the processor 408, so that the processor 408 can respond to the user input accordingly.

The user output interface 412 is arranged to provide a graphical/visual and/or audio output to a user, or operator, of the system 400. As such, the processor 408 may be arranged to instruct the user output interface 412 to form an image/video signal representing a desired graphical output, and to provide this signal to a monitor (or screen or display unit) 420 of the system 400 that is connected to the user output interface 412. Additionally or alternatively, the processor 408 may be arranged to instruct the user output interface 412 to form an audio signal representing a desired audio output, and to provide this signal to one or more speakers 421 of the system 400 that is connected to the user output interface 412.

Finally, the network interface 416 provides functionality for the computer 402 to download data from and/or upload data to one or more data communication networks.

It will be appreciated that the architecture of the system 400 illustrated in FIG. 4 and described above is merely exemplary and that other computer systems 400 with different architectures (for example with fewer components than shown in FIG. 4 or with additional and/or alternative components than shown in FIG. 4) may be used in embodiments of the invention. For example, the computer 402 may comprise a touch screen, which provides both the keyboard 424 and the monitor 420. As examples, the computer system 400 could comprise one or more of: a personal computer; a server computer; a mobile telephone; a tablet; a laptop; a television set; a set top box; a games console; other mobile devices or consumer electronics devices; etc.

Referring back to the CA system 100 of FIG. 4, the head-end system 120 could be, or could comprise, one or more computer systems 400 of FIG. 4 (such as one or more servers). Similarly, the device 130 could be, or could comprise, one or more computer systems 400 of FIG. 4—for example, the device 130 could be a set-top-box or a personal computer. Referring back to the DRM system 300 of FIG. 3, the DRM provider 320 could be, or could comprise, one or more computer systems 400 of FIG. 4 (such as one or more servers). Similarly, the device 330 could be, or could comprise, one or more computer systems 400 of FIG. 4—for example, the device 330 could be a personal computer.

4—Combined CA and DRM for Broadcast Content

Figure 6:
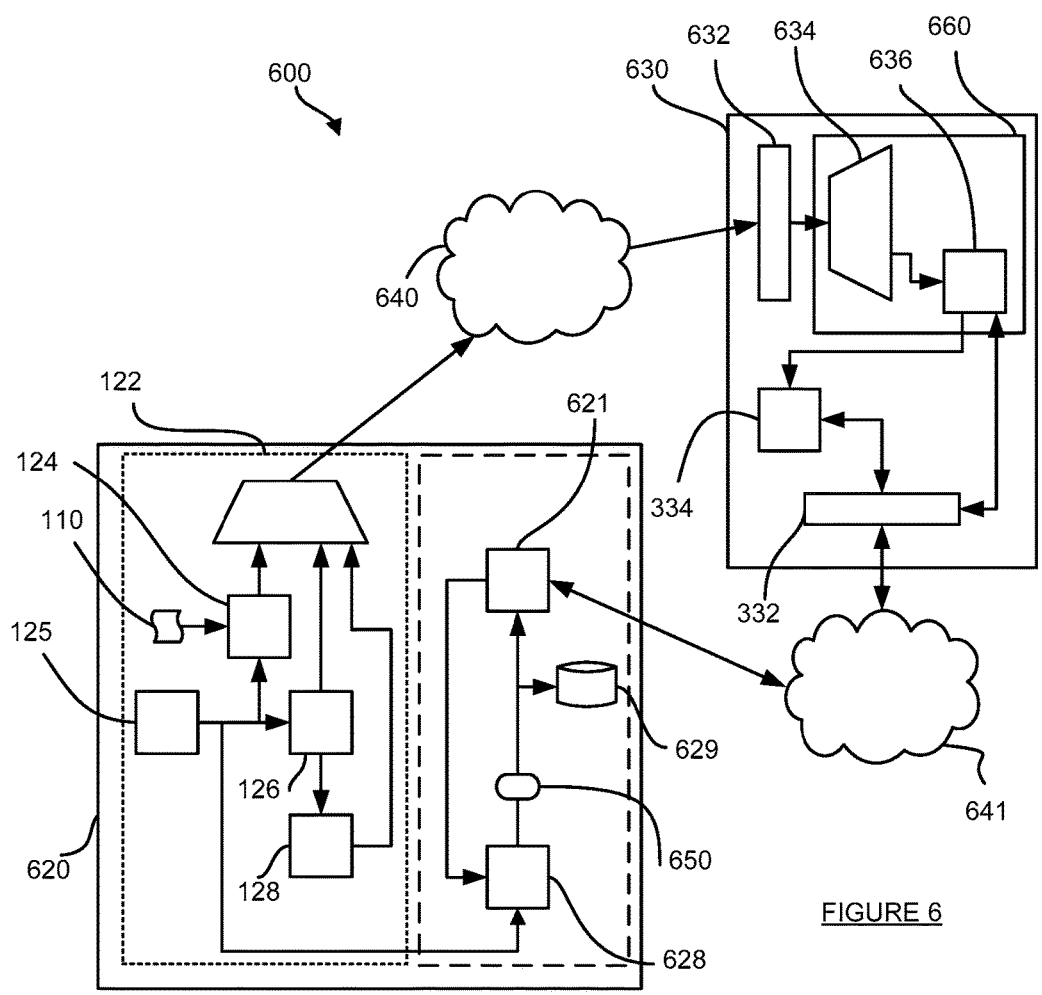
FIG. 6 schematically illustrates a system according to an embodiment of the invention.

FIG. 6 schematically illustrates a system 600 according to an embodiment of the invention. The system 600 comprises a head-end system 620 communicably coupled to a user's device (or receiver) 630 via a broadcast network 640 and via a data communications network 641.

The head-end system 620 is arranged to provide (or communicate or transmit) an item of content 110, in encrypted (or scrambled) form, to the device 630 via the broadcast network 640. The broadcast network 640 may be any network for broadcasting items of content and may, for example, comprise a satellite communications network or a terrestrial broadcast network.

The head-end system 620 comprises a multiplexor 122, a content encryption module 124, a CW generator 125, an ECM generator 126 and an EMM generator 128, which operate in the same manner as described above with reference to the CA system 100 of FIG. 1 and as discussed with reference to FIG. 2. Therefore, the nature and operation of these components of the head-end system 620 shall not be described again. As for the CA system 100 of FIG. 1, the multiplexor 122, the content encryption module 124, the CW generator 125, the ECM generator 126 and the EMM generator 128 may each be, or may be implemented by, a hardware component, a software component executed by a processor of the head-end system 620, or a combination of hardware and software components.

In summary, though, the head-end system 620 identifies (or specifies) a plurality (or sequence) of CPs ($CP_i$ for i=1, 2, . . . ) for, or in relation to, an item of content 110, generates (using the CW generator 125) corresponding CWs ($CW_i$ for i=1, 2, . . . ) and encrypts (using the content encryption module 124) a corresponding portion ($P_i$ for i=1, 2, . . . ) of the item of content 110 with the corresponding CW ($CW_i$ for i=1, 2, . . . ) to generate an encrypted item of content comprising encrypted portions $\{P_i\}_{CW_i}$. The ECM generator 126 may generate ECMs comprising an encrypted version $\{CW_i\}_K$ of a respective CW, whilst the EMM generator 128 may generate EMMs comprising an encrypted version $\{K\}_W$ of the key K, where such EMMs are targeted at one or more devices/receivers. In this sense, the head-end system 620 (or at least the above-mentioned components of the head-end system 620 within the dotted line in FIG. 6) acts as a head-end system 120 of the CA system 100. Indeed, it is possible that one or more receivers 130, as described above with respect to FIG. 1, may receive and process the encrypted portions $\{P_i\}_{CW_i}$, ECMs and EMMs as has already been described.

As described above, the encrypted portions (i.e. $\{P_i\}_{CW_i}$ for i=1, 2, . . . ) may be packaged (or formatted) according to a format of the CA system 100 before being communicated to the device 630.

Thus, the head-end system 620 is arranged to provide, or transmit/communicate, a broadcast signal to the device 630, where the broadcast signal comprises a plurality of encrypted portions of content $\{P_i\}_{CW_i}$, each encrypted portion $\{P_i\}_{CW_i}$ being packaged in a format of a CA system 100 and being decryptable using a corresponding decryption key $CW_i$.

The head-end system 620 is arranged to provide one or more rights objections (ROs) to the device 630 via the data communications network 641. The data communications network 641 may be any data communication network via which the head-end system 620 may communicate data to the device 630 and via which the device 630 may communicate data to the head-end system 620. The data communications network 641 may, for example, comprise one or more of: a local area network, a wide area network, a metropolitan area network, the Internet, a wireless communication network, a wired or cable communication network, etc. The data communications network 641 may be, for example, an IP network via which IP data can be communicated. The device 630 and the head-end system 620 may be arranged to communicate with each other via the data communications network 641 via any suitable data communication protocol. For example, when the data communications network 641 is the Internet, the data communication protocol may be HTTP, TCP/IP, etc.

In order to be able to provide one or more rights objections (ROs) to the device 630, the head-end system 620 comprises a rights object (RO) generator 628, an RO database or store 629, and a control module 621. These may each be, or may be implemented by, a hardware component, a software component executed by a processor of the head-end system 620, or a combination of hardware and software components.

The rights object (RO) generator 628 operates in a similar manner to the RO generator 328 of the DRM system 300, except that the RO generator 628 is arranged to generate ROs based on CWs generated by the CW generator 125 instead of ROs based on the one or more keys $K_i$ used by the DRM provider 320.

Figure 7:
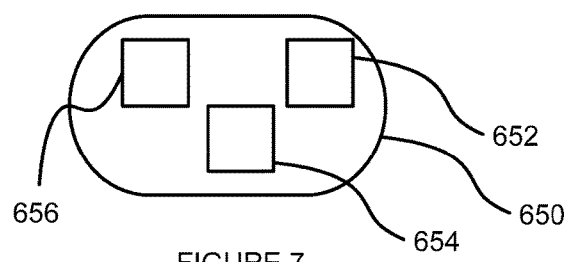
FIG. 7 schematically illustrates an example rights object.

In particular, the RO generator 628 is arranged to receive the CWs generated by the CW generator 125. The RO generator 628 generates one or more ROs 650, wherein each RO 650 comprises decryption key data for use by a DRM client 334 of the device 630 to obtain one or more CWs. The nature of the RO 650 is illustrated schematically in FIG. 7, and is similar to the RO 350 illustrated in FIG. 5. The RO 650 is a data object comprising decryption key data 652, which is data from which one or more CWs can be obtained by the DRM client 334. For example, the decryption key data 652 may comprise one or more CWs in an encrypted form, where the DRM client 334 has access to a corresponding decryption key for decrypting these encrypted one or more CWs to thereby obtain the one or more CWs. The RO 650 may also contain content metadata 654, which may comprise any metadata such as data identifying the item of content 110, data specifying properties (e.g. data format, bit rate, etc.) of the item of content 110, data specifying other data (e.g. title, actors, creation/release date(s), etc.) relating to the item of content 110, etc. The RO 650 may also contain usage data 656 specifying one or more usage rights or conditions or privileges or entitlements associated with the item of content 110 (such as a number of times that the item of content 110 may be used at the device 630 and/or a time of day during which the item of content 110 may be used at the device 630 and/or whether or not the item of content 110 may be recorded and/or copied and/or redistributed by the device 630; etc.). Some or all of the data of the RO 650 may be stored in the RO 650 in a protected form (e.g. encrypted and/or digitally signed) to prevent unauthorised access and/or modification. The DRM client 334 may, therefore, be arranged to decrypt, and/or validate the authenticity of, some/all of the data of the RO 650 and/or validate the authenticity of the origin of the RO 650, where such decryption and/or validation uses one or more cryptographic keys known to, or accessible by, the DRM client 334. It will be appreciated that the ROs 650 may take other forms too.

The RO 650 may be stored in the RO database 629. The RO 650 may subsequently be accessed from the RO database 629 and communicated, via the data communications network 641, to the device 630 (e.g. in response to the head-end system 620 receiving a request from the device 630). Additionally or alternatively, the RO 650 output from the RO generator 628 may be provided to the device 630 (without necessarily having to be stored first in the RO database 629).

The control module 621 coordinates the generation and provision of ROs 650. For example, the control module 621 may be arranged, in response to a request received from the device 630, to cause the RO generator 528 to generate an RO 650 corresponding to a particular CP or one or more particular CWs for a corresponding portion P of the item of content 110 and to provide the generated RO 650 to the device 630 via the data communications network 641. Similarly, the control module 621 may be arranged, in response to a request received from the device 630, to retrieve (or access or obtain or read) from the RO database 629 an RO 650 corresponding to a particular CP or one or more particular CWs for a corresponding portion P of the item of content 110 and to provide the retrieved RO 650 to the device 630 via the data communications network 641. The control module 621 may also perform other DRM functionality, such as: determining whether a device 630 is authorised to receive ROs or to access an item of content 110 (and only providing ROs to a device 630 if that device is so authorised); handling the processing of payment/subscription details; etc.

In this sense, the head-end system 620 (or at least the above-mentioned components of the head-end system 620 within the dashed line in FIG. 6) acts as at least part of the DRM provider 320 of the DRM system 300, insofar as the head-end system 620 is arranged to generate and provide ROs.

The head-end system 620 may be, or may comprise, one or more computer systems 400 of FIG. 4 (such as one or more servers). Whilst the head-end system 620 is shown in FIG. 6 as a single entity, it is possible that different parts of the head-end system 620 may be implemented as separate (sub)systems—for example, the CA parts of the head-end system 620 (namely those in the dotted line) may be implemented via one or more computer systems whilst the DRM parts (or RO parts) of the head-end system 620 (namely those in the dash line) may be implemented via one or more computer systems.

The device 630 could be any device suitable for receiving the item of content 110 from the head-end system 620. The device 630 may also be arranged to render (e.g. output via a display or one or more speakers) a received item of content 110. For example, the device 630 could be a television, a set-top-box, a personal computer, etc. The device 630 comprises, or uses or executes, a broadcast network interface 632, an access application 660 that executes on a processor of the device 630, a DRM client 334 and a data network interface 332. These may each be, or may implemented by, a hardware component, a software component executed by a processor of the device 630, or a combination of hardware and software components. The device 630 could be, or could comprise, one or more computer systems 400 of FIG. 4.

In particular, the device 630 could initially be the same as a device 330 of the DRM system 300 of FIG. 3, insofar as the device 630 comprises a data network interface 332 and a DRM client 334 that may operate in the same manner as set out above with reference to FIG. 3. Consequently, they shall not be described in further detail except where necessary to understand embodiments of the invention.

In order to adapt the device 330 of FIG. 3 to be able to receive protected items of content 110 that are distributed by a broadcast signal (such as the item of content 110 that is distributed in encrypted form by the head-end system 620 via the broadcast network 640), the device comprises a broadcast network interface 632. The broadcast network interface 632 may, for example, comprise an antenna for receiving a signal broadcast via a satellite network 640 or via a terrestrial broadcast network 640, a demodulator/tuner and an analog-to-digital converter for obtaining and generating a digital signal from the received broadcast signal. The broadcast network interface 632 could comprise, for example, a DVB-T receiver. To be able to process the received protected items of content 110, it would be possible to install a software application on the device 630, for execution by a processor of the device 630, that carries out the operations of the demultiplexer 134, the CA module 136 and the decryption module 138 of the device 130 in the CA system 100 of FIG. 1. However, as mobile data processing devices (such as smartphones, tablet computers, laptops, etc.) are becoming more and more prevalent and are more often than not the user's preferred device, it is important to be able to deliver items of content to such mobile data processing devices (thereby satisfying user demand) whilst at the same time ensuring a high level of security (thereby satisfying the requirements of content providers and distributors). This is especially true given the very large number of such devices currently available and the rate at which new devices enter the market, coupled with the range of operating systems and software that such devices run, all of which make protection of content a difficult challenge. Simple allowing a user of such a device to install such an application on what may be an untrusted or comprised device or operating system vulnerable to attack poses a potential security risk.

Figure 9:
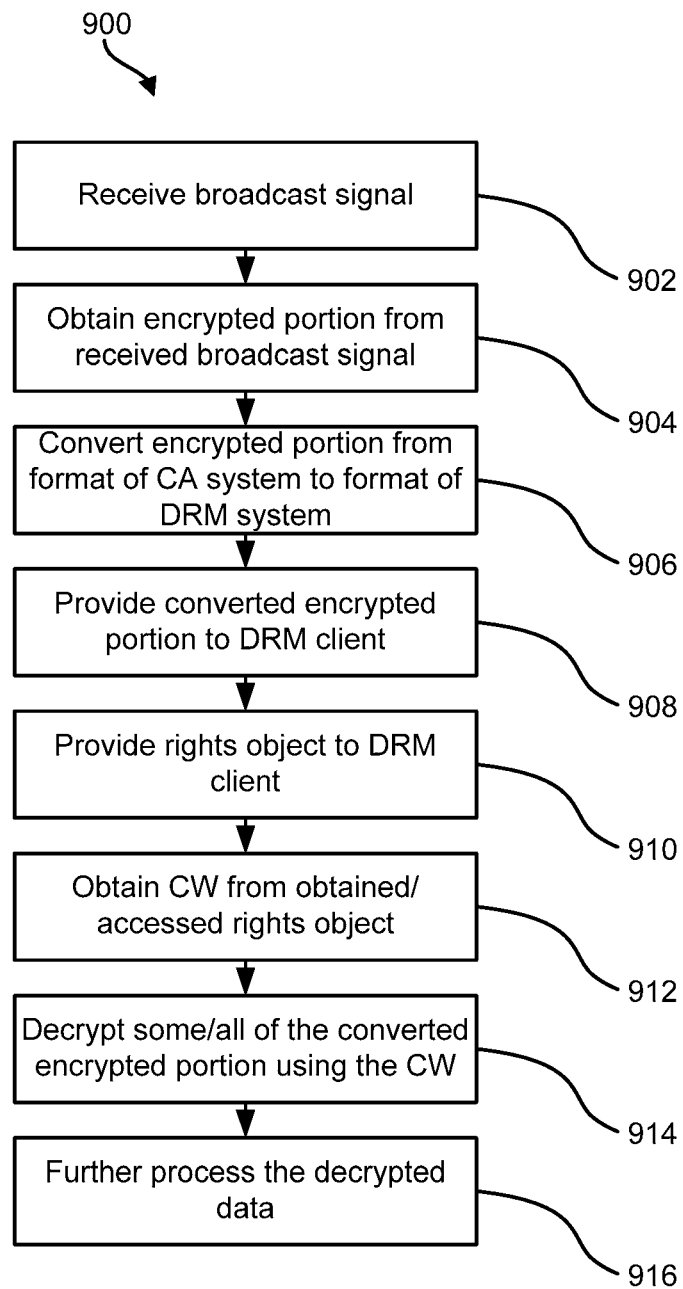
FIG. 9 is a flowchart illustrating a method according to an embodiment of the invention.

Consequently, in order to be able to process the protected items of content 110 received via the broadcast network interface 632 in a more secure manner, the device 630 is arranged to execute, on a processor of the device 630, the access application 660 as set out below. The access application 660, in conjunction with the DRM client 334, enable the device 630 (if authorised) to gain access to the item of content 110 received, in a protected/encrypted form in a broadcast signal, via the broadcast network interface 632. As shown in FIG. 9, the access application is separate from the DRM client 334 (i.e. they run or execute as two separate applications or modules).

The access application 660 comprises (or is arranged, when executed, to provide) a demultiplexer 634 and a conversion module 636.

The demultiplexer 634 is arranged to identify the different components in the signal received by the broadcast network interface 632 and to select encrypted portions $\{P_i\}_{CW_i}$ relating to a desired/selected service/program. For example, if the user of the device 630 wishes to watch/listen/record this specific item of content 110, then the demultiplexer 634 may identify, in the received broadcast signal, encrypted portions $\{P_i\}_{CW_i}$ relating to this item of content 110 and pass them to the conversion module 636. This is similar to the manner in which the demultiplexer 134 of the device 130 in FIG. 1 identified encrypted portions $\{P_i\}_{CW_i}$ and passed them to the decryption module 138. However, with the access application 660, the demultiplexer 634 does not pass the identified encrypted portions $\{P_i\}_{CW_i}$ to a decryption module 138 but, instead, passes them to a conversion module 636. Additionally, the demultiplexer 634 does not need to identify ECMs or EMMs relating to this item of content 110, since these are not used in this embodiment of the invention.

The conversion module 636 is arranged to convert an encrypted portion $\{P_i\}CW_i$ from being packaged in the format of the CA system 100 to being packaged in a format of the DRM system 300. In particular, as discussed above, each encrypted portion $\{P_i\}_{CW_i}$ will be communicated, as part of the broadcast signal via the broadcast network 640, packaged in the format of the CA system 100. This format of the CA system 100 will be different from the format for the DRM system 300. For example, as mentioned above, the encrypted portion $\{P_i\}_{CW_i}$ may be communicated in one or more data packets (that have various headers, error correction codes, identification data, etc.) and may be accompanied by additional data (such as metadata, an identification of a corresponding CP, etc.). These packets and additional data will be arranged or ordered in a different manner from that expected by the DRM client 334. In particular, the DRM client 334 will expect to receive encrypted content packaged in the format of the DRM system 300 e.g. as a data object comprising the encrypted content with additional data, in a particular order and/or structure, that may, for example, identify the item of content, specify where the encrypted content lies in the data object, provide a link or address for a DRM provider from which an RO may be obtained, identify a corresponding RO, etc. The conversion module 636 is arranged to convert an encrypted portion $\{P_i\}_{CW_i}$ from being packaged in the format of the CA system 100 to being packaged in a format of the DRM system 300—for this, the conversion module 636 creates a data object in the format of for the DRM system 300, where this data object comprises the encrypted portion $\{P_i\}_{CW_i}$ (located within the data object according to the format of the DRM system 300) together with any additional data required for the format of the DRM system 300. Some of this additional data may be derived from the packaging 200 of the CA system 100 (for example, metadata describing the title or creation/release date(s) for the item of content 110). Additionally or alternatively, some of this additional data may be provided by the conversion module 636 itself (for example, if the conversion module 636 knows the address or link for the head-end system 620, then the conversion module 636 can include this address or link into the data object).

Figure 8:
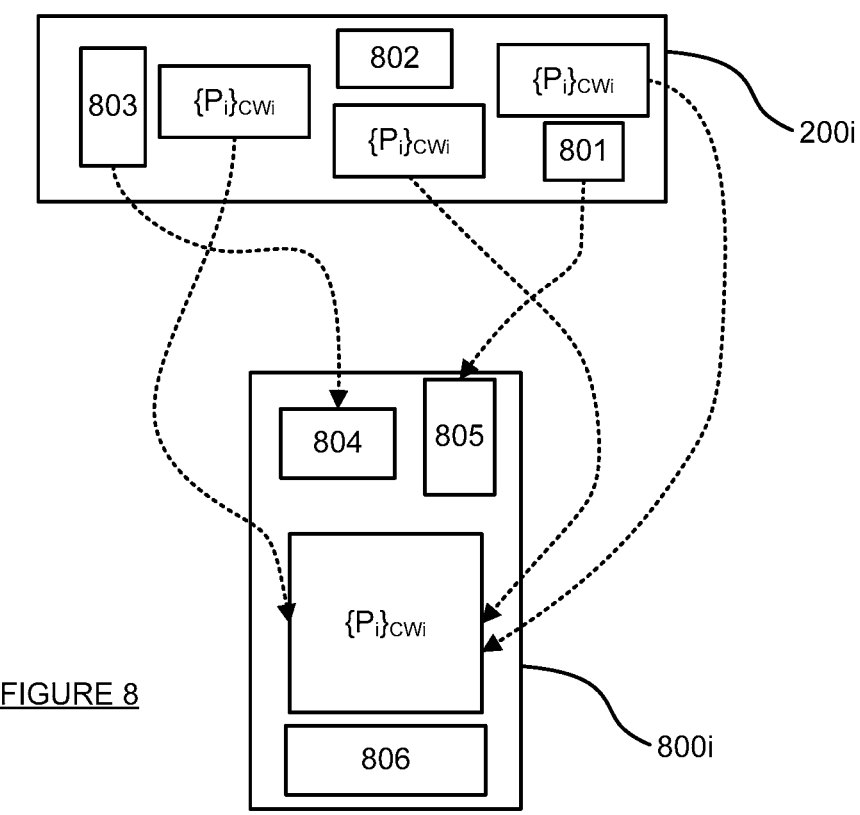
FIG. 8 schematically illustrates an example operation of a conversion module.

FIG. 8 schematically illustrates an example of how the conversion module 636 may convert the encrypted portion $\{P_i\}_{CW_i}$, which is packaged as an amount of data $200_i$ according to the format of the CA system 100 into the encrypted portion $\{P_i\}_{CW_i}$ being packaged as a corresponding data object $800_i$ according to the format of the DRM system 300. For example, one or more of the following may apply and may be implemented by the conversion module 636:

The data of the encrypted portion $\{P_i\}_{CW_i}$ may be located and/or partitioned within the amount of data $200_i$ in a manner according to the format of the CA system 100 whereas, as can be seen from FIG. 8, the data of the encrypted portion $\{P_i\}_{CW_i}$ is re-used by the conversion module 636 within the data object $800_i$ when forming the data object $800_i$. However, the data of the encrypted portion $\{P_i\}_{CW_i}$ but may be located and/or partitioned within the data object $800_i$ in a manner according to the format of the DRM system $300_i$ which may is be different from that of the format of the CA system 100.

As described above, the amount of data $200_i$ may comprise data 801 in addition to the data of the encrypted portion $\{P_i\}_{CW_i}$. When forming the data object $800_i$ the conversion module 636 may re-use that data 801, keeping it in its original form as data 805, within the data object $800_i$ (albeit potentially at a different location within the data object $800_i$ as dictated by the format of the DRM system 300 rather than its original location in the amount of data $200_i$).

As described above, the amount of data $200_i$ may comprise data 802 in addition to the data of the encrypted portion $\{P_i\}_{CW_i}$. When forming the data object $800_i$ the conversion module 636 may ignore this data 802. For example, the data 802 may not be supported by the format of the DRM system 300, or the data 802 may not be essential to the format of the DRM system 300 and so may be safely ignored by the conversion module 636.

As described above, the amount of data $200_i$ may comprise data 803 in addition to the data of the encrypted portion $\{P_i\}_{CW_i}$. When forming the data object $800_i$, the conversion module 636 may re-use that data 803, in a modified form (i.e. based at least in part on the data 803) as data 804, within the data object $800_i$ (albeit potentially at a different location within the data object $800_i$ as dictated by the format of the DRM system 300 rather than its original location in the amount of data $200_i$). For example, the data 803 may comprise an identification number for the particular encrypted portion $\{P_i\}_{CW_i}$ according to a numbering format for the format of the CA system 100, whereas the format of the DRM system 300 may require an identification number for the particular encrypted portion $\{P_i\}_{CW_i}$ in a different format than that specified by the format of the CA system 100. Thus, the conversion module 636 may perform processing on the data 801 to convert it to the data 804.

The conversion module 636 may include, within the data object $800_i$ data 806 that is not based on any of the data within the amount of data $200_i$. For example, the data 806 may comprise data providing a link or address for the head-end system 620.

Importantly, the conversion module 636 is arranged to convert an encrypted portion $\{P_i\}_{CW_i}$ from being packaged in the format of the CA system 100 to being packaged in a format of the DRM system 300 without decrypting the encrypted portion $\{P_i\}_{CW_i}$. Thus, the encrypted portion $\{P_i\}_{CW_i}$ remains secured whilst it is being processed by the access application 660.

FIG. 9 is a flowchart illustrating a method 900 according to an embodiment of the invention.

At a step 902, the device 630 receives at the broadcast network interface 632 an encrypted portion $\{P_i\}_{CW_i}$ as part of a broadcast signal from the head-end system 620 via the broadcast network 640.

At a step 904, the access application 660 uses its demultiplexor 634 to obtain (or extract) the encrypted portion $\{P_i\}_{CW_i}$ from the received broadcast signal.

At a step 906, the access application 660 uses its conversion module 636 to convert the encrypted portion $\{P_i\}_{CW_i}$ obtained by the demultiplexor 634 from being packaged in the format of the CA system 100 to being packaged in the format of the DRM system 300. This has been described in detail above.

At a step 908, the access application 660 provides (or communicates or sends or makes available) the encrypted portion $\{P_i\}_{CW_i}$ in the format of the DRM system 300 to the DRM client 334.

At a step 910, the access application 660 provides an RO 650 (which is an RO according to the DRM system 300) to the DRM client 334. This RO 650 corresponds to the encrypted portion $\{P_i\}_{CW_i}$ received at the step 904, insofar as the RO 650 comprises decryption key data 652 based on the CW (i.e. the decryption key $CW_i$) corresponding to the encrypted portion $\{P_i\}_{CW_i}$, so that the DRM client 334 is able to obtain $CW_i$ from the RO 650.

In one embodiment, in order to be able to provide the RO 650 to the DRM client 334, the access application 660 may identify one or more next encrypted portions $\{P_i\}_{CW_i}$ to be decrypted by the DRM client 334 (see the step 914) below. The access application 660 may do this in any one of a variety of ways. For example, the access application 660 may receive encrypted portions $\{P_i\}_{CW_i}$ sequentially and may identify, as a next encrypted portion $\{P_i\}_{CW_i}$ to be decrypted, the most recent encrypted portion(s) $\{P_i\}_{CW_i}$ that the access application 660 has received. Alternatively, the access application 660 may be aware of an identification number for a current encrypted portion $\{P_i\}_{CW_i}$ being decrypted by the DRM client 334 or a CP identification for that current encrypted portion $\{P_i\}_{CW_i}$, and the access application 660 may determine an identification number or CP identification number for the next encrypted portion $\{P_i\}_{CW_i}$ based on the identification number or CP identification number for the current encrypted portion $\{P_i\}_{CW_i}$ (e.g. if these numbers are sequential). Based on (or in response to) this identification of one or more next encrypted portions $\{P_i\}_{CW_i}$ to be decrypted by the DRM client 334, the access application 660 may issue a request (via the data network interface 332 and the data communications network 641) to the head-end system 620. This is a request for an RO 650 that corresponds to the identified one or more next encrypted portions $\{P_i\}_{CW_i}$ to be decrypted by the DRM client 334. Thus, the request may provide an explicit identification for the one or more next encrypted portions $\{P_i\}_{CW_i}$ to be decrypted by the DRM client 334 (e.g. an identification number of these encrypted portions $\{P_i\}_{CW_i}$ or a CP identification number for these encrypted portions $\{P_i\}_{CW_i}$). Alternatively, the request may simply indicate that an RO 650 for a next encrypted portion $\{P_i\}_{CW_i}$ is desired, leaving it to the control module 621 to work out which RO 650 to provide (based on which ROs 650 have been previously provided to the device 630). The control module 621 of the head-end system 620 may, in response to this request, provide the RO 650 to the access application 660 (via the data communications network 641 and the data network interface 332). As discussed above, this provision of the RO 650 may comprise the control module 621 accessing the RO 650 that corresponds to the identified one or more next encrypted portions $\{P_i\}_{CW_i}$ from the RO database 629 or may comprise the control module 621 instructing the RO generator 628 to generate the RO 650 that corresponds to the identified one or more next encrypted portions $\{P_i\}_{CW_i}$. The provision of the RO 650 may comprise the control module 621 verifying that the device 330 (or the user of the device 330 or the DRM client 334 or the access application 660) is authorised to access the item of content 110 (e.g. if a payment or subscription has been made for this item of content 110)—if there is authorisation, then the control module 621 may send the RO 650 to the access application 660; if there is not authorisation, then the control module 621 may not send the RO 650 to the access module 660.

Thus, the RO 650 may be obtained by the access application 660 and provided to the DRM client 334 as and when (or just before) the DRM client 334 needs the RO 650 in order to be able to decrypt the encrypted portion $\{P_i\}_{CW_i}$ obtained at the step 904.

At a step 912, the DRM client 334 obtains, from the received or accessed RO 650, the CW corresponding to the encrypted portion $\{P_i\}_{CW_i}$ obtained at the step 904 (i.e. $CW_i$), this being done using the decryption key data 652 of the RO 650.

At a step 914, the DRM client 334 decrypts some or all of this encrypted portion $\{P_i\}_{CW_i}$ using the obtained $CW_i$ to obtain at least part of the portion $P_i$. Naturally, for decryption to be possible, the decryption algorithm applied by the DRM client 334 should be the same as the decryption algorithm applied by the decryption module 138 (and, therefore, the encryption algorithm used by the DRM system 300 should be the same as the encryption algorithm used by the CA system 100).

At a step 916, the DRM client 334 outputs the at least part of the portion $P_i$ (i.e. the result of the step 914). This at least part of the portion $P_i$ may, for example, be passed to one or more subsequent processing modules for corresponding subsequent processing. For example, if the portion $P_i$ is in a compressed format (e.g. MPEG2 or H.264), then one of the subsequent processing modules may perform corresponding data decompression as appropriate. Similarly, one of the subsequent processing modules may be arranged to perform error correction or error detection on the at least part of the portion $P_i$. The at least part of the portion $P_i$ may (following such subsequent processing) finally be output or rendered to the user, for example, via an output interface 412 (e.g. to a monitor 420 of the device 630 and/or to one or more speakers 421 of the device 630). Additionally or alternatively, the at least part of the portion $P_i$ may (either before or following such subsequent processing) be stored on a storage medium (such as the storage medium 408 or the device 422).

The steps 902-916 may be performed for each of one or more of the encrypted portions that may be communicated by the head-end system 620 as part of the broadcast signal.

Figure 10:
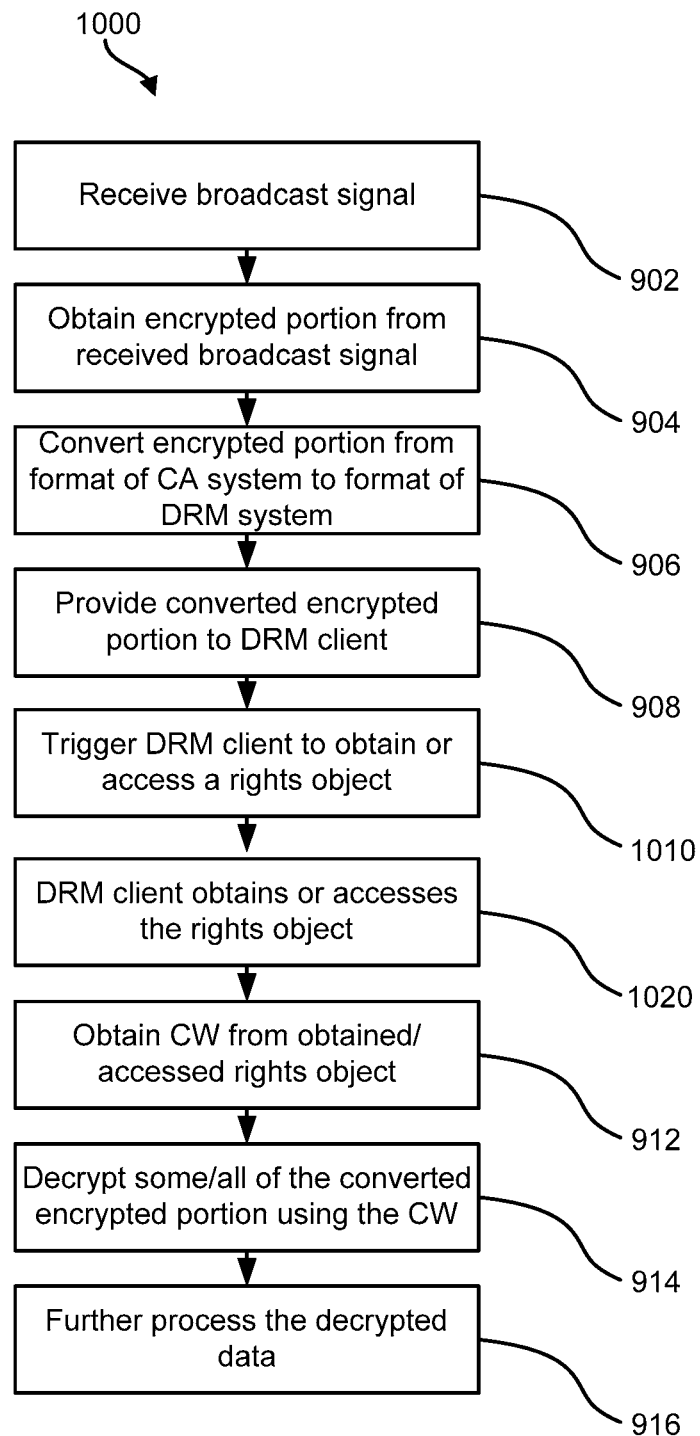
FIG. 10 is a flowchart illustrating a method according to an embodiment of the invention.

FIG. 10 is a flowchart illustrating a method 1000 according to an embodiment of the invention. This is the same as the method 900 of FIG. 9, except that the step 910 of the method 900 has been replaced by steps 1010 and 1020. For the other steps of the method 1000, being the same as the correspondingly numbered steps of the method 900, the above description of those steps for the method 900 applies equally to the method 1000.

At the step 1010, the access application 660 triggers the DRM client 334 to obtain or access an RO 650 (which is an RO according to the DRM system 300). This RO 650 corresponds to the encrypted portion $\{P_i\}_{CW_i}$ received at the step 904 insofar as the RO 650 comprises decryption key data 652 based on the CW (i.e. the decryption key $CW_i$) corresponding to the encrypted portion $\{P_i\}_{CW_i}$, so that the DRM client 334 is able to obtain $CW_i$ from the RO 650.

At the step 1020, the DRM client 334, in response to being triggered by the access application 660, accesses or obtains the RO 650.

The steps 1010 and 1020 may be performed in the same manner as the step 910 of FIG. 9, except that it is the DRM client 334 that generates and issues the request for the RO 650 instead of the access application 660 generating and issuing the request. The method 1000 is, therefore, particularly suited to embodiments in which the head-end system 620 (and in particular the control module 621) is arranged to only process requests for ROs received from corresponding DRM clients 334 of the DRM system 300 (in which case the method 900 would not work as the request is issued, at the step 910, from the access application 660).

The trigger at the step 1010 may simply comprise the access application 660 sending a signal or message (such as an interrupt) to the DRM client 334 in order to for the DRM client 334 to generate and issue the request as set out above. Alternatively, the step 1010 may involve the access application 660 generating or obtaining an identification for the encrypted portion $\{P_i\}_{CW_i}$ (e.g. an identification number of the encrypted portion $\{P_i\}_{CW_i}$ or a CP identification for the encrypted portion $\{P_i\}_{CW_i}$) in the manner discussed above for the step 910, and the trigger at the step 1010 may comprise the access application 660 sending a signal or message containing this identification to the DRM client 334 in order to for the DRM client 334 to generate and issue the request, based on the identification in the trigger, as set out above.

The RO 650 may then be received by either the DRM client 334 or the access application 660. If the RO 650 is received by the access application 660, then the access application 660 passes the received RO 650 to the DRM client 334.

In the method 900, the step 910 may be performed in order to obtain an RO 650 for the encrypted portion $\{P_i\}_{CW_i}$ once that encrypted portion $\{P_i\}_{CW_i}$ has been received at the step 902. Alternatively, the broadcast signal may comprise an identification of one or more next (or subsequent or future) encrypted portions $\{P_i\}_{CW_i}$ that will be received by the device 630 (for example an identification of one or more next CPs) in which case the step 910 may be performed in order to obtain an RO 650 for those one or more next encrypted portions $\{P_i\}_{CW_i}$ in advance of (i.e. before) those one or more encrypted portions $\{P_i\}_{CW_i}$ have been received at the step 902. Similarly, the access application 660 may be able to determine or calculate for itself an identification of one or more next (or subsequent or future) encrypted portions $\{P_i\}_{CW_i}$ that will be received by the device 630 (for example, if the portions $P_i$ or crypto-periods $CP_i$ have sequential identification numbers) in which case the step 910 may be performed in order to obtain an RO 650 for those one or more next encrypted portions $\{P_i\}_{CW_i}$ in advance of (i.e. before) those one or more encrypted portions $\{P_i\}_{CW_i}$ have been received at the step 902.

The same applied analogously to the method 1000. In particular, in the method 1000, the steps 1010 and 1020 may be performed in order to obtain an RO 650 for the encrypted portion $\{P_i\}_{CW_i}$ once that encrypted portion $\{P_i\}_{CW_i}$ has been received at the step 902. Alternatively, the broadcast signal may comprise an identification of one or more next (or subsequent or future) encrypted portions $\{P_i\}_{CW_i}$ that will be received by the device 630 (for example an identification of one or more next CPs), in which case the steps 1010 and 1020 may be performed in order to obtain an RO 650 for those one or more next encrypted portions $\{P_i\}_{CW_i}$ in advance of (i.e. before) those one or more encrypted portions $\{P_i\}_{CW_i}$ have been received at the step 902. Similarly, the DRM client 334 may be able to determine or calculate for itself an identification of one or more next (or subsequent or future) encrypted portions $\{P_i\}_{CW_i}$ that will be received by the device 630 (for example, if the portions Pi or crypto-periods CPs have sequential identification numbers) in which case the step 910 may be performed in order to obtain an RO 650 for those one or more next encrypted portions $\{P_i\}_{CW_i}$ in advance of (i.e. before) those one or more encrypted portions $\{P_i\}_{CW_i}$ have been received at the step 902.

Figure 11:
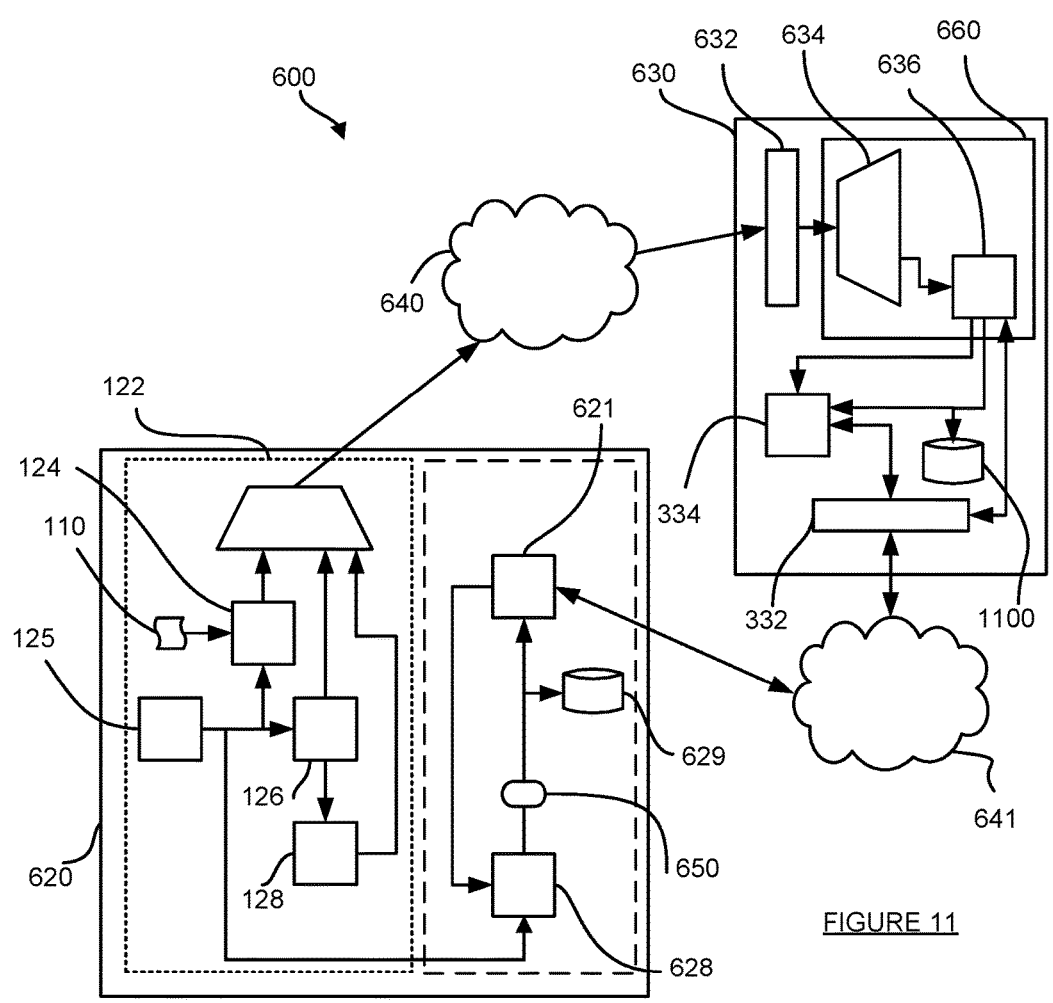
FIG. 11 schematically illustrates a system according to an embodiment of the invention.

FIG. 11 schematically illustrates the system 600 of FIG. 6, where the device 630 additionally comprises an RO database or store 1100. The description of FIG. 6 above applies analogously to FIG. 11. The use of the RO database 1100 is set out below.

The embodiments of the methods 900 and 1000 described above rely on the device 630 being able to obtain the RO 650 via the data communications network 641 either after receiving the corresponding encryption portion $\{P_i\}_{CW_i}$ or shortly before receiving the corresponding encrypted portion $\{P_i\}_{CW_i}$, with either the access application 660 or the DRM client 334 issuing requests over the data communications network 641 and receiving ROs 650 over the data communications network 641 as and when the ROs 650 are (or will be) required. The embodiments described below with reference to FIG. 11 enable the device 630 to receive the ROs 650 that will be required for accessing the item of content 110 in advance so that, at the time of receiving the encrypted portions $\{P_i\}_{CW_j}$, the device 630 no longer needs to be connected to the data communications network 641. This is advantageous as the user will be able to access protected broadcast content in locations where the device 630 does not have a data connection (i.e. is unable to communicate over the data communications network 641).

Figure 12:
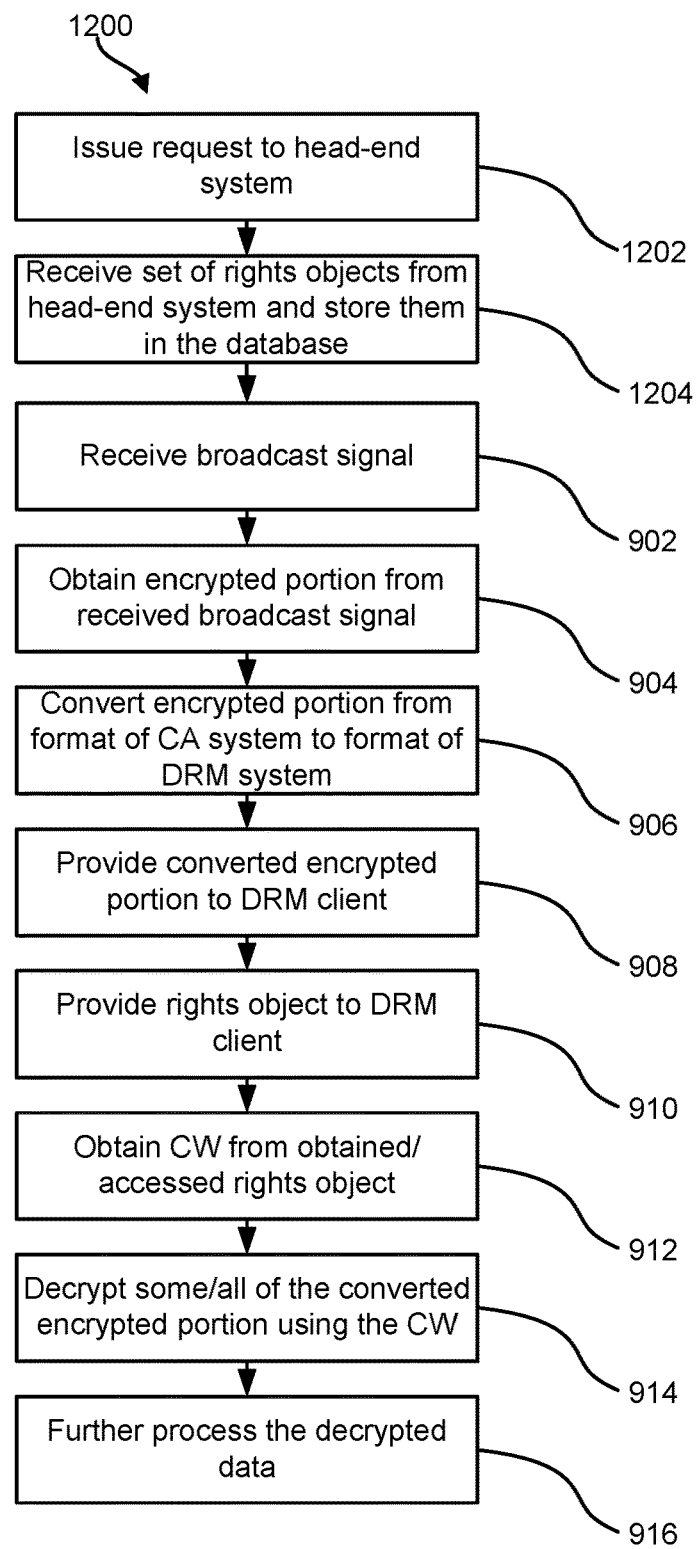
FIG. 12 is a flowchart illustrating a method according to an embodiment of the invention.

FIG. 12 is a flowchart illustrating a method 1200 according to an embodiment of the invention. The method 1200 is the same as the method 900 described above, except that (a) the method 1200 has additional steps 1202, 1204 prior to the step 902 and (b) the step 910 is performed differently in this embodiment from the above-described embodiments.

In particular, the step 1202 comprises the access application 660 or the DRM client 334 issuing a request (via the data network interface 332 and the data communications network 641) to the head-end system 620. This request may identify the item of content 110. The control module 621 of the head-end system 620 may, in response to this request, provide a set of one or more ROs 650 relating to the item of content 110 to the access application 660 or the DRM client 334 (via the data communications network 641 and the data network interface 332). As discussed above, this provision of the ROs 650 may comprise the control module 621 accessing the ROs 650 from the RO database 629 or may comprise the control module 621 instructing the RO generator 628 to generate the ROs 650. The provision of the ROs 650 may comprise the control module 621 verifying that the device 330 (or the user of the device 330 or the DRM client 334 or the access module 660) is authorised to access the item of content 110 (e.g. if a payment or subscription has been made for this item of content)—if there is authorisation, then the control module 621 may send the ROs 650 to the access module 660 or to the DRM client 334; if there is not authorisation, then the control module 621 may not send the RO 650 to the access module 660 or to the DRM client 334.

At the step 1204, the set of ROs 650 is received by the access application 660 or by the DRM client 334 and these ROs 650 are stored in the RO database 1100. The ROs 650 may be stored in the RO database 1100 in a manner indexed by an identifier for the corresponding encrypted portion(s) $\{P_i\}_{CW_j}$ to which the ROs 650 relate. For example, if an RO 650 comprises decryption key data 652 for one or more encrypted portions $\{P_i\}_{CW_j}$, $\{P_j\}_{CW_j}$, . . . , then the RO database 1100 may be structured so that this RO 650 is stored in the database and may be accessed or obtained from the RO database 1100 by looking up, or using as an index, an identifier for any one of those corresponding one or more encrypted portions $\{P_i\}_{CW_j}$, $\{P_j\}_{CW_j}$, . . . . These identifiers could be (or could be based on) an identifier of the CP to which the encrypted portion(s) relate.

In some embodiments, this set of ROs 650 is a set of ROs that enables the DRM client 334 to access the entirety of the item of content 110.

Therefore, at the step 910, the access application 660, instead of issuing a request (via the data network interface 332 and the data communications network 641) to the head-end system 620 for an RO 650, may obtain an RO 650 from the RO database 110, where this obtained RO 650 corresponds to the encrypted portion $\{P_i\}_{CW_j}$ received at the step 902.

Figure 13:
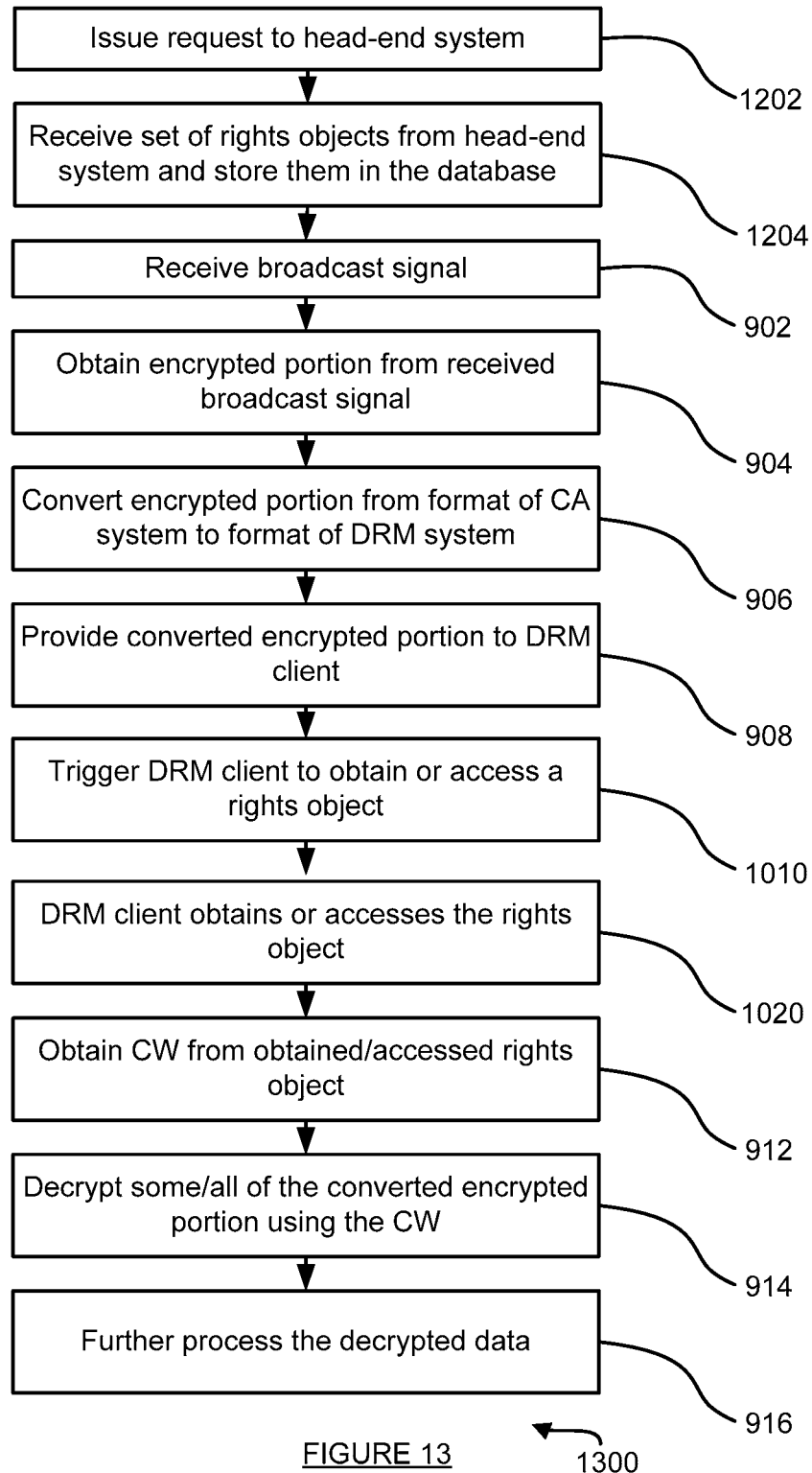
FIG. 13 is a flowchart illustrating a method according to an embodiment of the invention.

FIG. 13 is a flowchart illustrating a method 1300 according to an embodiment of the invention. The method 1300 is the same as the method 1000 described above, except that (a) the method 1300 has the additional steps 1202, 1204 prior to the step 902 as already described above with reference to FIG. 12 and (b) the step 1020 is performed differently in this embodiment from the above-described embodiments.

At the step 1020, the DRM client 334, instead of issuing a request (via the data network interface 332 and the data communications network 641) to the head-end system 620 for an RO 650, may obtain an RO 650 from the RO database 110, where this obtained RO 650 corresponds to the encrypted portion $\{P_i\}_{CW_j}$ received at the step 902.

Figure 14:
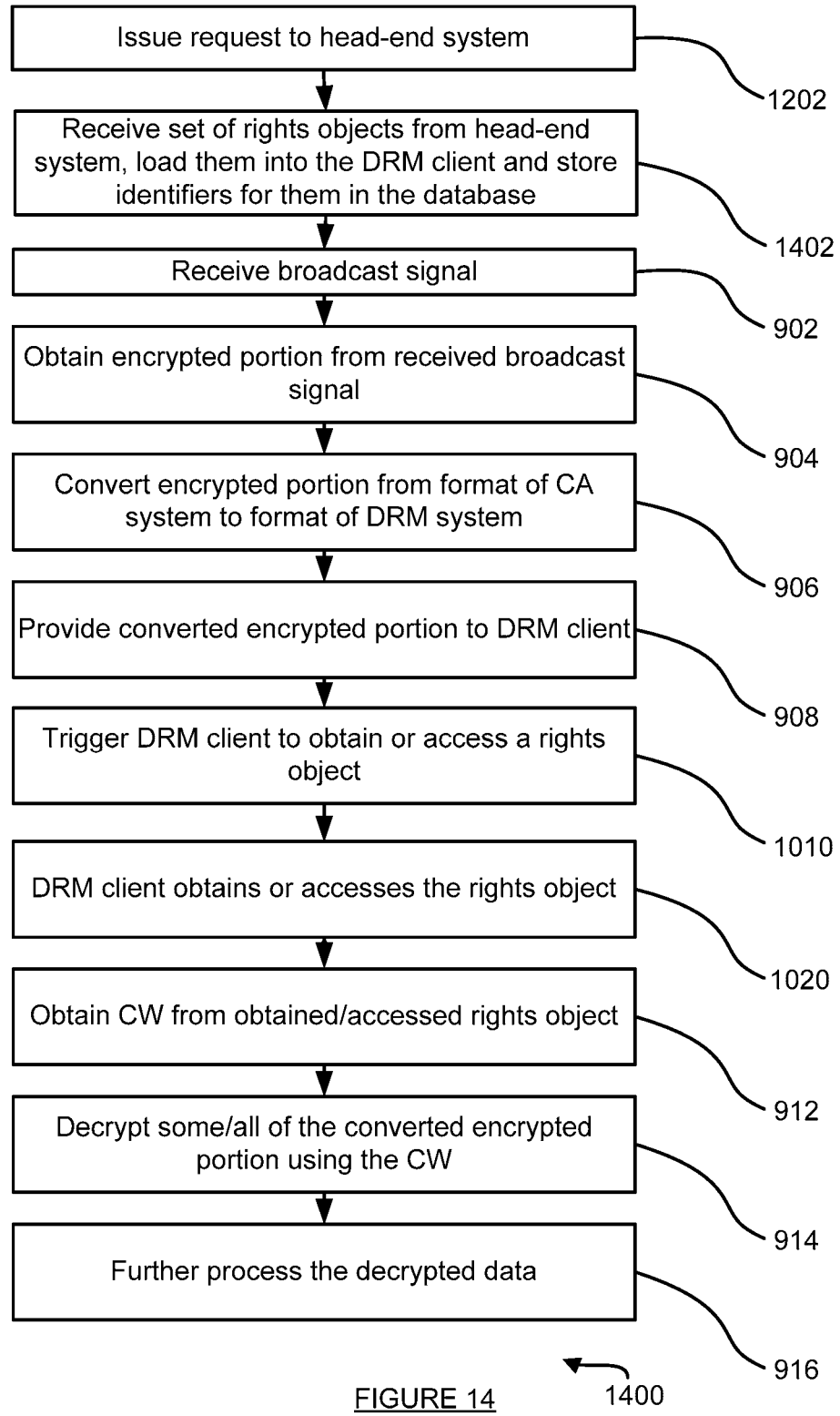
FIG. 14 is a flowchart illustrating a method according to an embodiment of the invention.

FIG. 14 is a flowchart illustrating a method 1400 according to an embodiment of the invention. The method 1400 is the same as the method 1000 described above, except that (a) the method 1400 has additional steps 1202, 1402 prior to the step 902 and (b) the step 1020 is performed differently in this embodiment from the above-described embodiments.

The step 1202 in the method 1400 is performed in the same manner as the step 1202 in the methods 1200 and 1300.

At the step 1402, the set of ROs 650 is received by the access application 660 or by the DRM client 334 in response to the request issued at the step 1202. If the set of ROs 650 is received by the access application 660, then the access application 660 passes (or communicates/transfers) the set of ROs 650 to the DRM client 334. Rather than storing the received set of ROs 650 in the RO database 1100 (as is done at the step 1204 in the methods 1200, 1300), the set of ROs 650 is loaded into the memory of the DRM client 334, so that they are accessible by the DRM client 334 later on (namely for the step 912).

The access application 660 or the DRM client 334 may then store, in the RO database 1100, an identifier for each of the received ROs 650, where each RO identifier is stored in association with one or more one or more encrypted portions $\{P_i\}_{CW_j}$, $\{P_j\}_{CW_j}$, . . . . For example, each RO identifier may be stored in the RO database 1100 in a manner indexed by an identifier of the corresponding encrypted portion(s) $\{P_i\}_{CW_j}$, $\{P_j\}_{CW_j}$, . . . to which the RO 650 with that RO identifier relates. For example, if an RO 650 comprises decryption key data 652 for one or more encrypted portions $\{P_i\}_{CW_j}$, $\{P_j\}_{CW_j}$, . . . then the RO database 1100 may be structured to that an identifier of this RO 650 is stored in the database and may be accessed or obtained from the RO database 1100 by looking up, or using as an index, an identifier of any one of those corresponding one or more encrypted portions $\{P_i\}_{CW_j}$, $\{P_j\}_{CW_j}$, . . . . These portion identifiers could be (or could be based on) an identifier of the CP to which the encrypted portion(s) relate.

In one embodiment, the step 1010 then comprises the access application 660 obtaining an identifier for an encrypted portion $\{P_i\}_{CW_j}$ that is to be decrypted by the DRM client 334. The access application 660 may then look up, in the RO database 110, a corresponding RO identifier that corresponds to the obtained identifier for the encrypted portion $\{P_i\}_{CW_j}$. The access application 660 may then trigger the DRM client 334 to obtain or access the RO 650 that the DRM client 334 has already loaded and that corresponds to this RO identifier—the trigger, for example, may be a message sent from the access application 660 to the DRM client 334 that comprises this RO identifier.

In another embodiment, the step 1010 comprises the access application 660 triggering the DRM client 334 (e.g. sending a message or signal to the DRM client indicating that another encrypted portion $\{P_i\}_{CW_j}$ is to be decrypted). In response to the trigger, the DRM client 334 may obtain or determine (as described above) an identifier for an encrypted portion $\{P_i\}_{CW_j}$ that is to be decrypted by the DRM client 334. This identifier for the encrypted portion $\{P_i\}_{CW_j}$ may be determined by the access application 660 and provided to the DRM client 334 as part of the trigger message, or, alternatively, the DRM client 336 may itself determine the identifier for the encrypted portion $\{P_i\}_{CW_j}$ without reference to the trigger. The DRM client 334 may then look up, in the RO database 110, a corresponding RO identifier that corresponds to the obtained identifier for the encrypted portion $\{P_i\}_{CW_j}$. The DRM client 334 may then obtain or access the RO 650 that the DRM client 334 has already loaded that corresponds to this RO identifier.

In some embodiments of the methods 1000, 1300 and 1400, the triggering is performed simply by virtue of the access application 660 passing an encrypted portion $\{P_i\}_{CW_j}$ to the DRM client 334 at the step 908.

In some embodiments of the methods 1200, 1300 and 1400, a set of ROs 650 may be obtained in relation to multiple items of content 110. These sets of ROs (or identifiers for these ROs) may then be stored in the RO database 1100. This means that the user of the device 630 can perform channel/service changes to gain access to multiple channels/services even when the device 630 does not have access to the data communications network 641.

In some embodiments, the DRM client 334 executes in a trusted execution environment (TEE) of the device 630, whilst the access application 660 does not execute in the TEE. TEE are well-known, and shall not be described in more detail herein. However, it will be appreciated that, by not having the access application 660 perform any decryption on the received protected content, there is no degradation in the security offered at the device. Thus, security may be maintained at the level provided by the DRM client 334 (and the TEE if the DRM client 334 executes in the TEE).

5—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for accessing content at a device, wherein the device is arranged to execute a digital rights management (DRM) client of a DRM system and wherein the device is arranged to receive a broadcast signal comprising a plurality of encrypted portions of content for an item of content, each encrypted portion being packaged in a format of a conditional access system and being decryptable using a corresponding decryption key, wherein the method comprises an application executing on the device performing the steps of:
  for each of one or more of the encrypted portions:
    converting said encrypted portion from being packaged in the format of the conditional access system to being packaged in a format of the DRM system;
    providing said encrypted portion packaged in the format of the DRM system to the DRM client; and
    either (a) providing a rights object according to the DRM system to the DRM client or (b) triggering the DRM client to obtain a rights object according to the DRM system;
    wherein the rights object corresponds to said encrypted portion by comprising decryption key data for use by the DRM client to obtain the decryption key corresponding to said encrypted portion;
  the method further comprising, for each of said one or more of the encrypted portions, the device:
    receiving the rights object corresponding said encrypted portion over a data network;
    issuing a request over the data network, wherein, for each of said one or more of the encrypted portions, the corresponding rights object is received in response to the request;

loading each received rights object into the DRM client; and storing, in a data store at the device, an identification of the each received rights object in association with an identification of the corresponding encrypted portion;

wherein said triggering comprises either: (i) obtaining from the data store an identification of the rights object corresponding to an encrypted portion to be provided to the DRM client based on the identification of that encrypted portion and providing said obtained identification of the rights object to the DRM client or (ii) providing the identification of an encrypted portion to be provided to the DRM client to the DRM client to enable the DRM client to obtain from the data store an identification of the rights object corresponding to that encrypted portion.

2. The method of claim 1 comprising the DRM client:
obtaining the decryption key corresponding to said encrypted portion using the decryption key data; and
decrypting some or all of said encrypted portion using the obtained decryption key.

3. The method of claim 1, wherein the application is separate from the DRM client.

4. The method of claim 3, wherein the DRM client executes in a trusted execution environment of the device and the application does not execute in the trusted execution environment.

5. The method of any one of claims 1, 3 or 4, further comprising identifying a next encrypted portion to be decrypted by the DRM client and issuing a request over the data network for a rights object corresponding to said next encrypted portion, wherein the rights object corresponding to said next encrypted portion is received in response to the request.

6. The method of claim 5, wherein the request is issued by the application.

7. The method of claim 5, comprising the application:
receiving the rights object in response to the request; and
providing the received rights object to the DRM client.

8. The method of claim 5, wherein said issuing comprises the application performing said triggering the DRM client and the DRM client, in response to said triggering, issuing the request.

9. The method of any one of claims 1, 3 or 4, further comprising:
issuing a request over the data network, wherein, for each of said one or more of the encrypted portions, the corresponding rights object is received in response to the request; and
storing, in a data store at the device, the received rights objects to enable the DRM client to subsequently obtain the stored rights objects.

10. The method of any one of claims 1, 3 or 4, wherein the identification of an encrypted portion is based on an identification of a crypto-period corresponding to that encrypted portion.

11. The method of any one of claims 1, 3 or 4, wherein the identification of an encrypted portion is received by the device within the broadcast signal.

12. The method of any one of claims 1, 3 or 4, wherein the device is one of:
(a) a mobile communications device;
(b) a mobile telephone;
(c) a tablet computer;
(d) a mobile data processing device.

13. The method of any one of claims 1, 3 or 4, wherein an encryption algorithm used by the conditional access system to generate the plurality of encrypted portions is the same as a content encryption algorithm used by the DRM system.

14. A device arranged to execute a digital rights management (DRM) client of a DRM system and to receive a broadcast signal comprising a plurality of encrypted portions of content for an item of content, each encrypted portion being packaged in a format of a conditional access system and being decryptable using a corresponding decryption key, wherein the device is arranged to:
for each of one or more of the encrypted portions:
convert said encrypted portion from being packaged in the format of the conditional access system to being packaged in a format of the DRM system;
provide said encrypted portion packaged in the format of the DRM system to the DRM client; and
either (a) provide a rights object according to the DRM system to the DRM client or (b) trigger the DRM client to obtain a rights object according to the DRM system;
wherein the rights object corresponds to said encrypted portion by comprising decryption key data for use by the DRM client to obtain the decryption key corresponding to said encrypted portion;
the device further arranged to, for each of said one or more of the encrypted portions:
receive the rights object corresponding said encrypted portion over a data network;
issue a request over the data network, wherein, for each of said one or more of the encrypted portions, the corresponding rights object is received in response to the request;
load each received rights object into the DRM client; and
store, in a data store at the device, an identification of the each received rights object in association with an identification of the corresponding encrypted portion;
wherein to trigger the DRM client the device is arranged to either: (i) obtain from the data store an identification of the rights object corresponding to an encrypted portion to be provided to the DRM client based on the identification of that encrypted portion and providing said obtained identification of the rights object to the DRM client or (ii) provide the identification of an encrypted portion to be provided to the DRM client to the DRM client to enable the DRM client to obtain from the data store an identification of the rights object corresponding to that encrypted portion.

15. A method for enabling a device to access content, wherein the device is arranged to execute a digital rights management (DRM) client of a DRM system, the device being a device according to claim 14, the method comprising:
transmitting, via a broadcast network, a broadcast signal comprising a plurality of encrypted portions of content for an item of content, each encrypted portion being packaged in a format of a conditional access system and being decryptable using a corresponding decryption key; and
providing, for each of one or more of the encrypted portions, a corresponding rights object, wherein said rights object corresponds to said encrypted portion by comprising decryption key data for use by the DRM client to obtain the decryption key corresponding to said encrypted portion.

16. A system arranged to enable a device to access content, wherein the device is arranged to execute a digital rights management (DRM) client of a DRM system, the device being a device according to claim 14, the system arranged to:

transmit, via a broadcast network, a broadcast signal comprising a plurality of encrypted portions of content for an item of content, each encrypted portion being packaged in a format of a conditional access system and being decryptable using a corresponding decryption key; and provide, for each of one or more of the encrypted portions, a corresponding rights object, wherein said rights object corresponds to said encrypted portion by comprising decryption key data for use by the DRM client to obtain the decryption key corresponding to said encrypted portion.

17. A non-transitory computer-readable medium storing a computer program which, when executed by one or more processors of a device, causes the one or more processors to carry out a method for accessing content at the device, wherein the device is arranged to execute a digital rights management (DRM) client of a DRM system and wherein the device is arranged to receive a broadcast signal comprising a plurality of encrypted portions of content for an item of content, each encrypted portion being packaged in a format of a conditional access system and being decryptable using a corresponding decryption key, wherein the method comprises an application executing on the device performing the steps of:

for each of one or more of the encrypted portions:
      converting said encrypted portion from being packaged in the format of the conditional access system to being packaged in a format of the DRM system;
      providing said encrypted portion packaged in the format of the DRM system to the DRM client; and
      either (a) providing a rights object according to the DRM system to the DRM client or (b) triggering the DRM client to obtain a rights object according to the DRM system;
   wherein the rights object corresponds to said encrypted portion by comprising decryption key data for use by the DRM client to obtain the decryption key corresponding to said encrypted portion;
   the method further comprising, for each of said one or more of the encrypted portions, the device:
      receiving the rights object corresponding said encrypted portion over a data network;
      issuing a request over the data network, wherein, for each of said one or more of the encrypted portions, the corresponding rights object is received in response to the request;
      loading each received rights object into the DRM client; and
      storing, in a data store at the device, an identification of the each received rights object in association with an identification of the corresponding encrypted portion;
   wherein said triggering comprises either: (i) obtaining from the data store an identification of the rights object corresponding to an encrypted portion to be provided to the DRM client based on the identification of that encrypted portion and providing said obtained identification of the rights object to the DRM client or (ii) providing the identification of an encrypted portion to be provided to the DRM client to the DRM client to enable the DRM client to obtain from the data store an identification of the rights object corresponding to that encrypted portion.

\* \* \* \* \*